June 10, 1952 — J. W. WHALEY — 2,600,038
CONVEYER SYSTEM
Filed Feb. 11, 1947 — 18 Sheets-Sheet 1

Inventor
J. W. WHALEY
By Church & Church
His Attorneys

June 10, 1952   J. W. WHALEY   2,600,038
CONVEYER SYSTEM
Filed Feb. 11, 1947   18 Sheets-Sheet 2
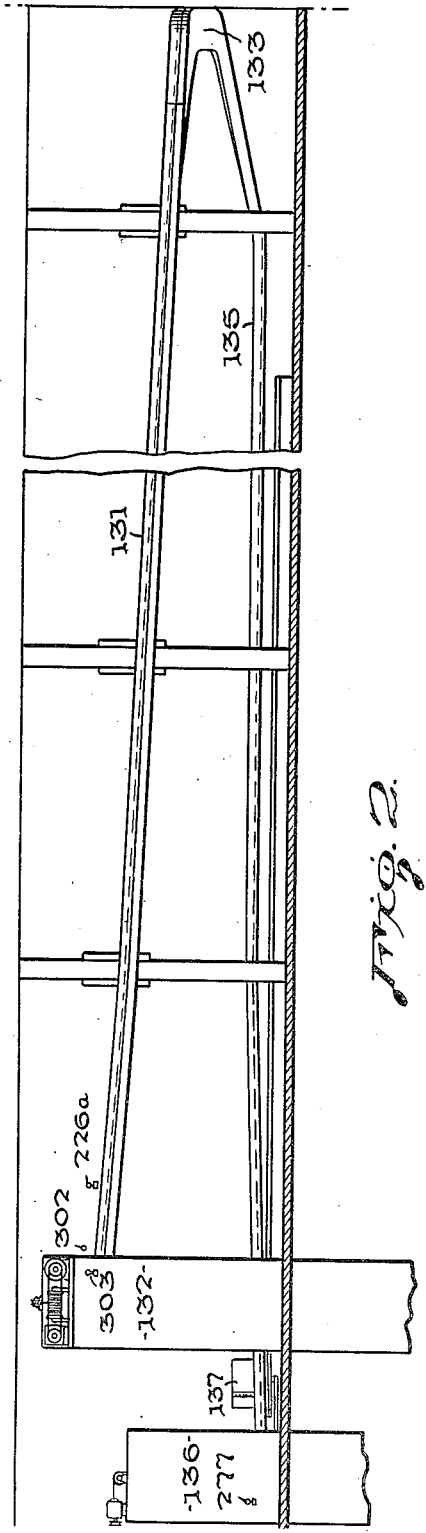
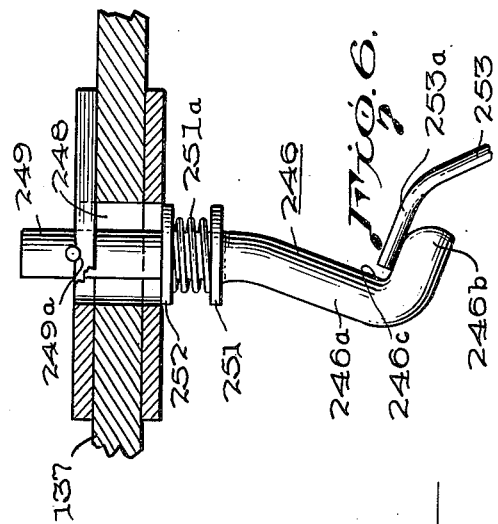
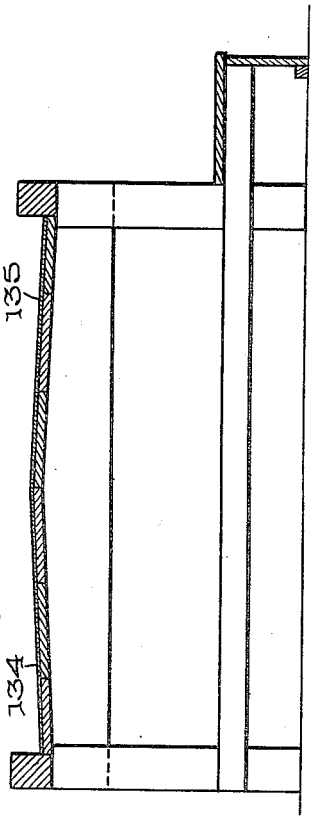
Inventor
J. W. WHALEY
By Church & Church
His Attorneys

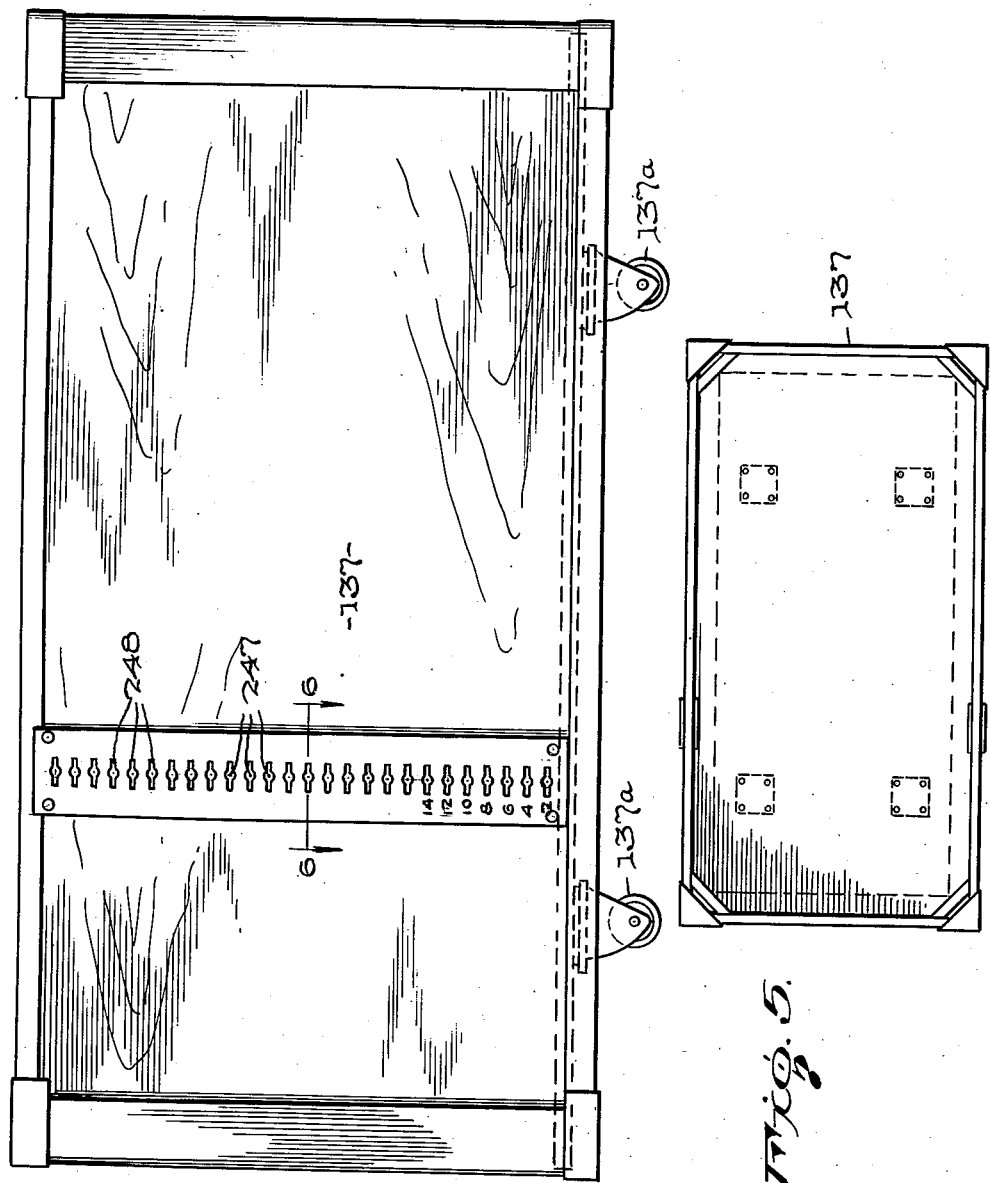

June 10, 1952  J. W. WHALEY  2,600,038
CONVEYER SYSTEM
Filed Feb. 11, 1947  18 Sheets-Sheet 4
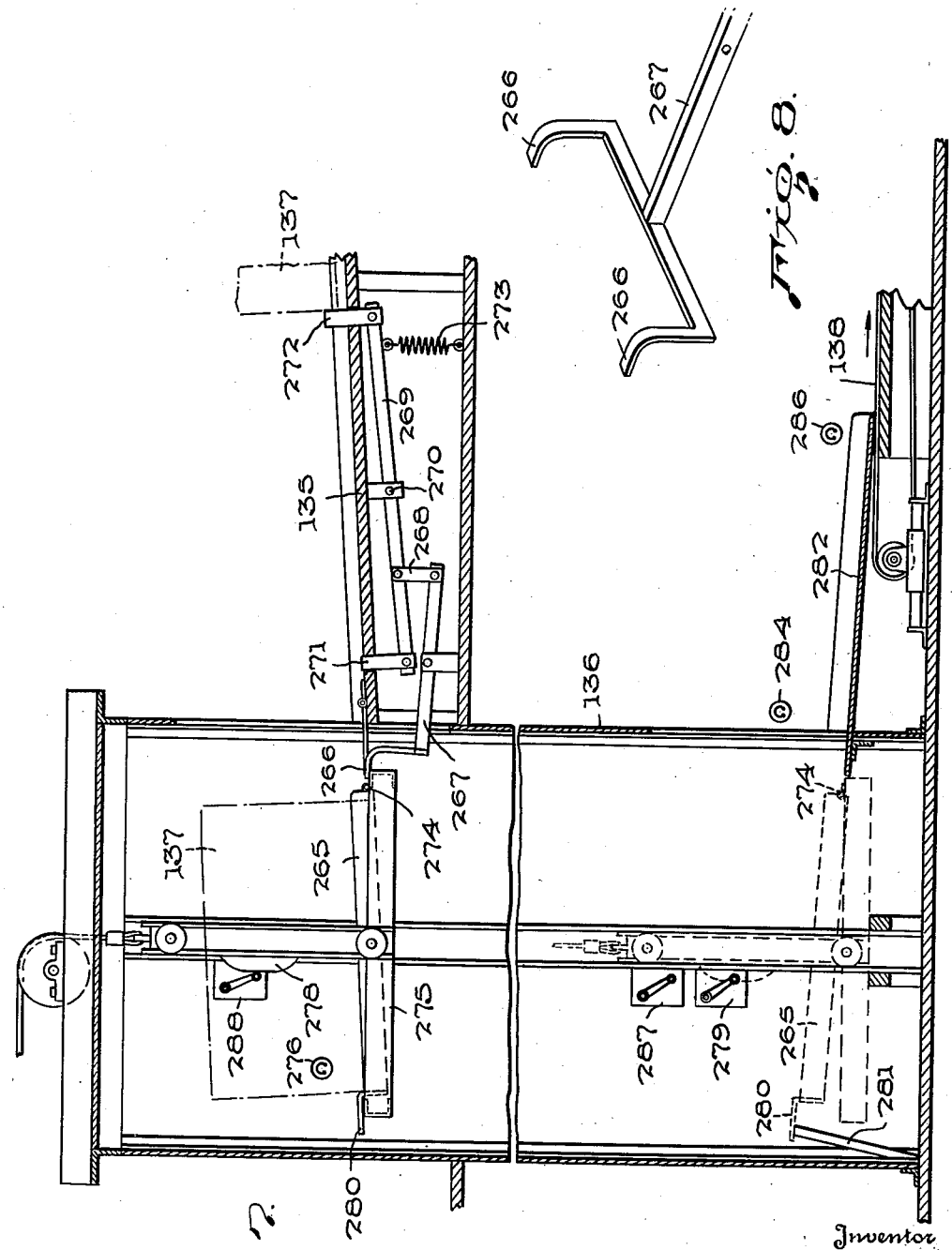
Inventor
J. W. WHALEY
By Church & Church
His Attorneys

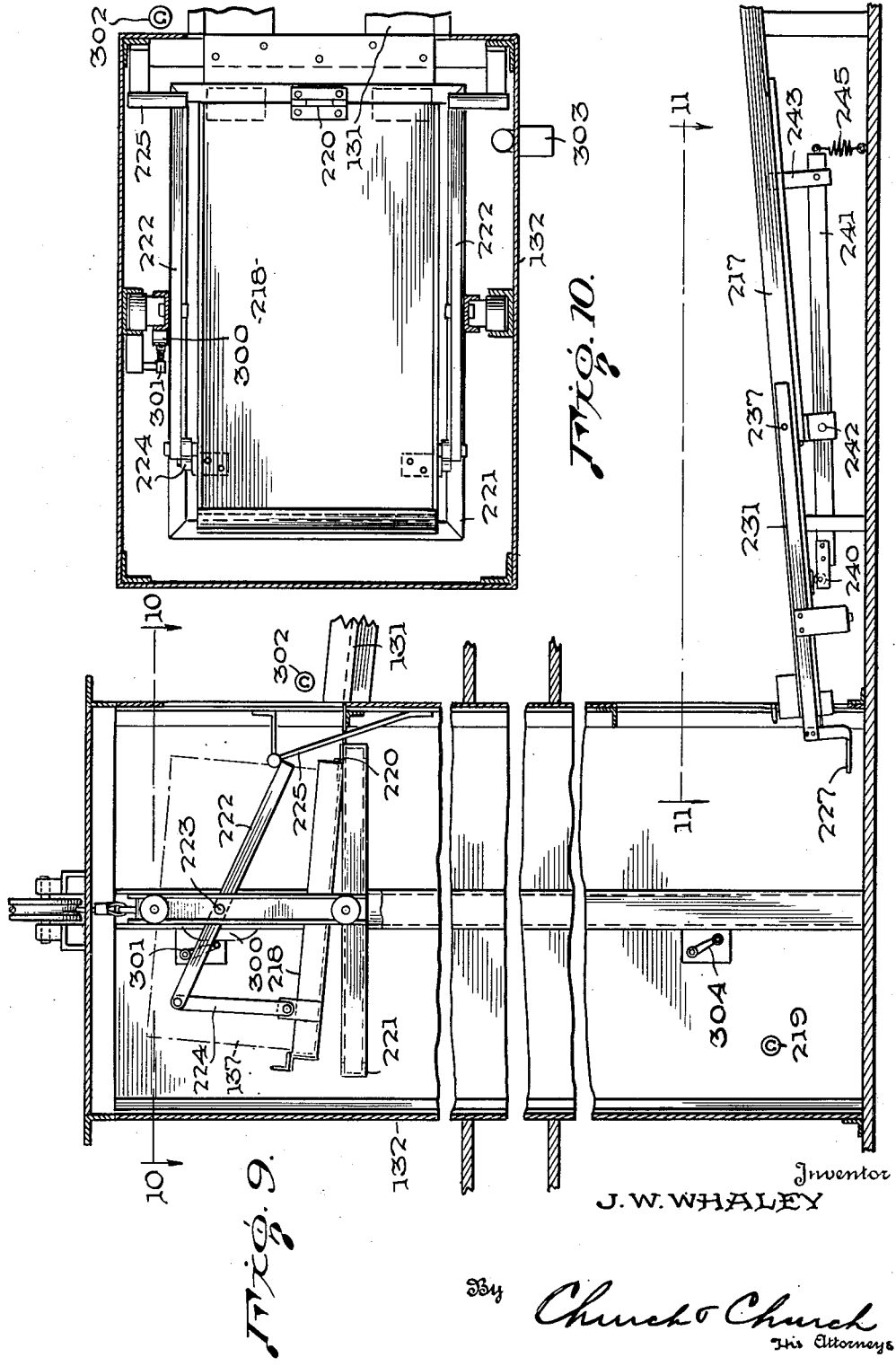

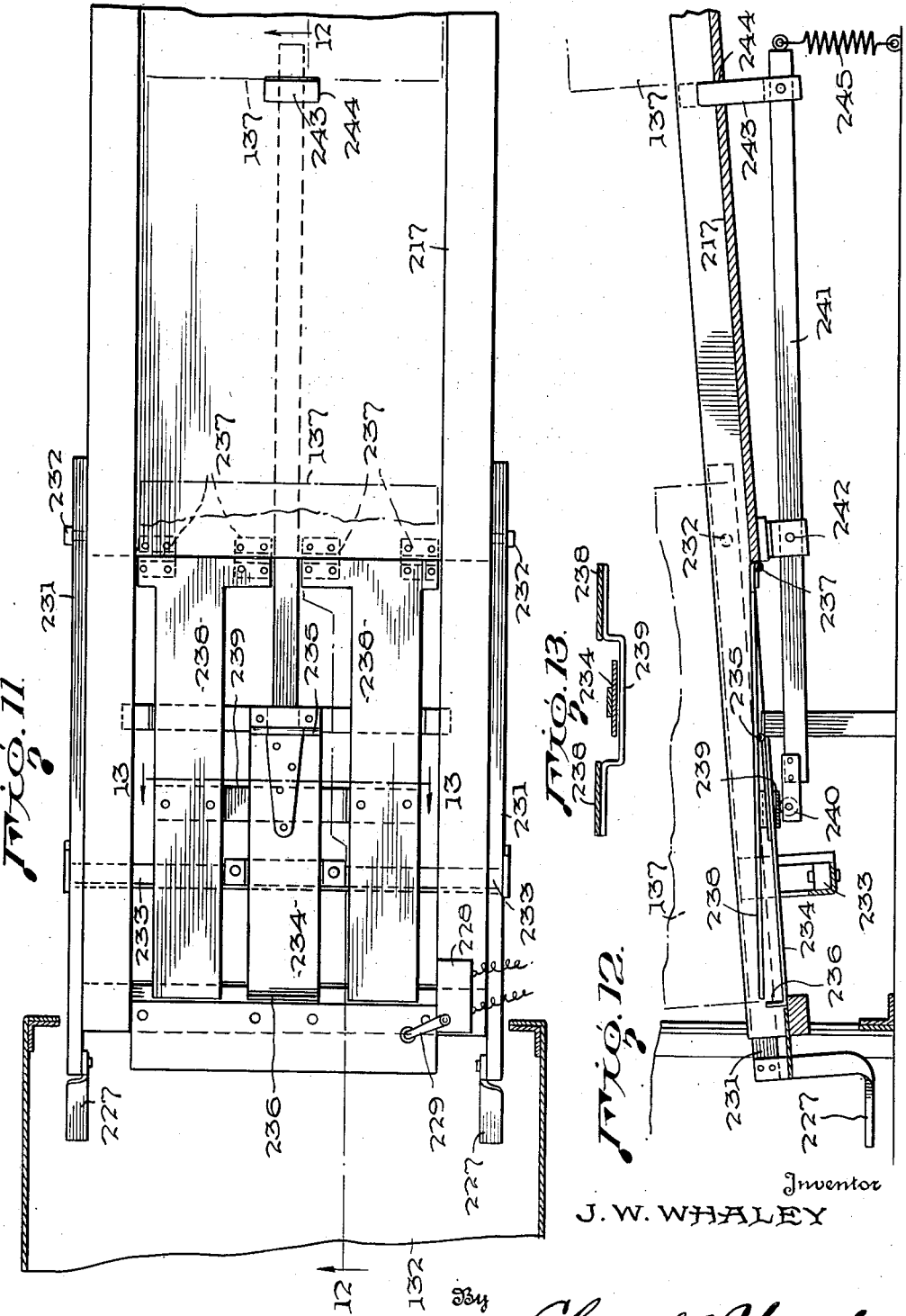

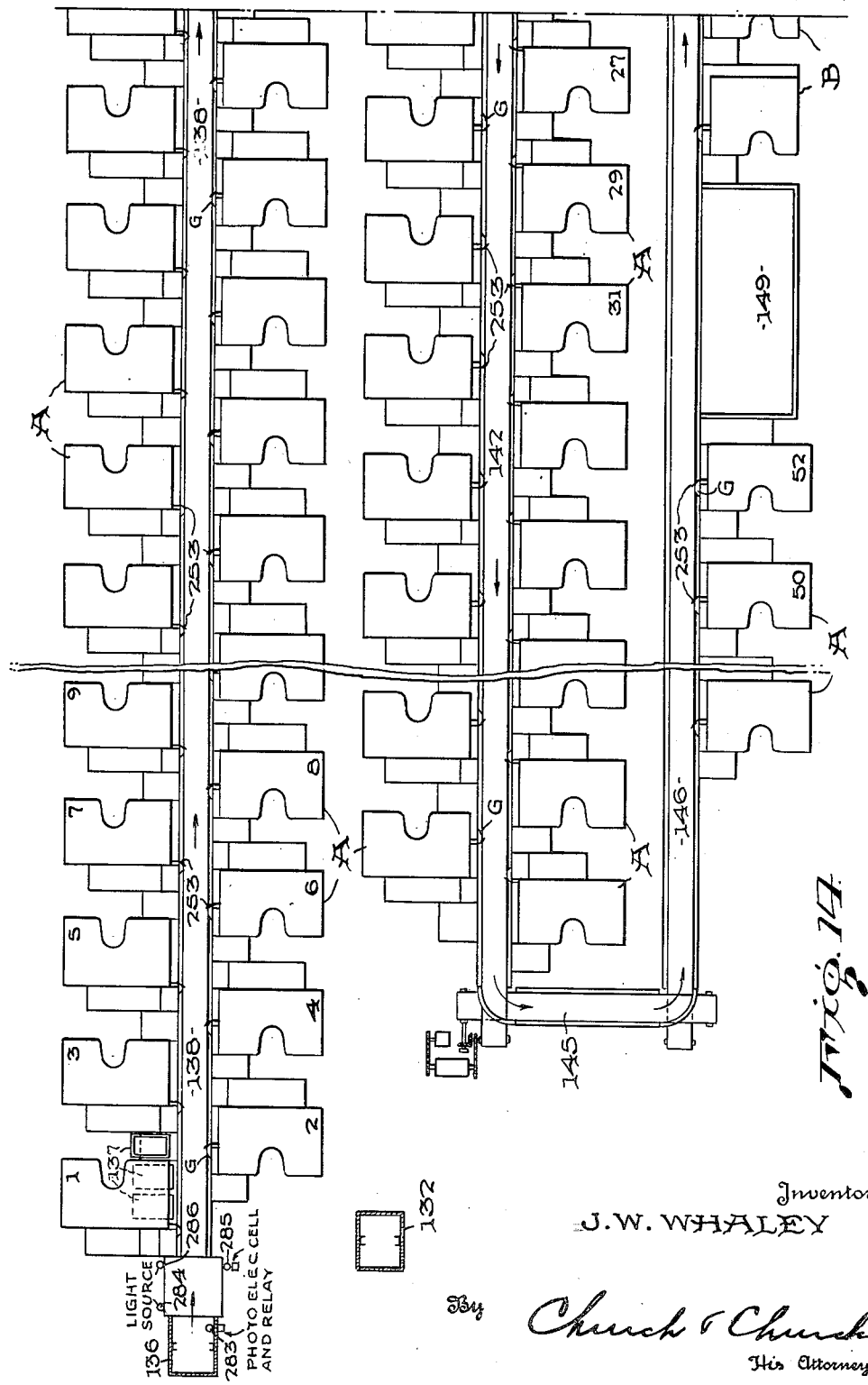

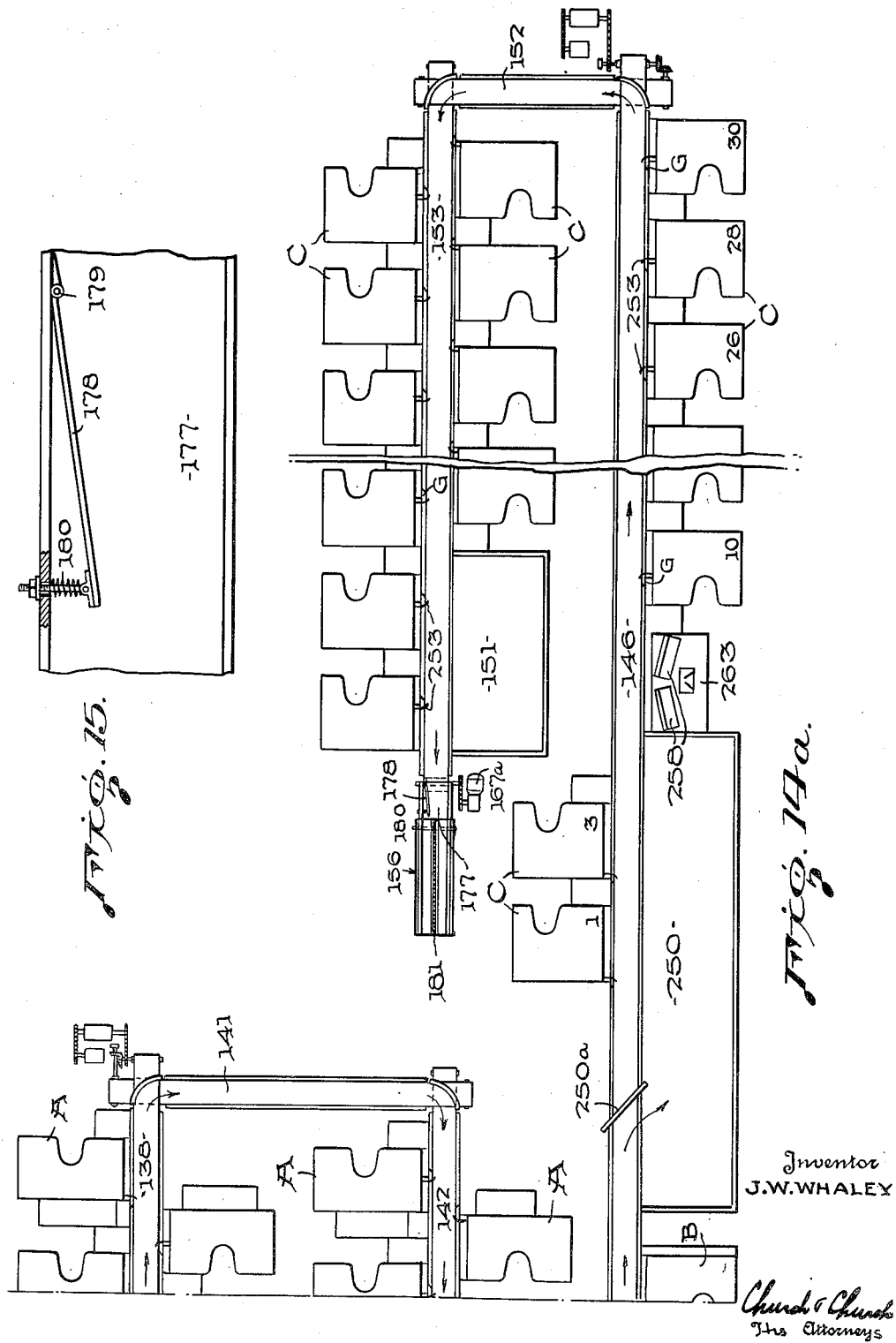

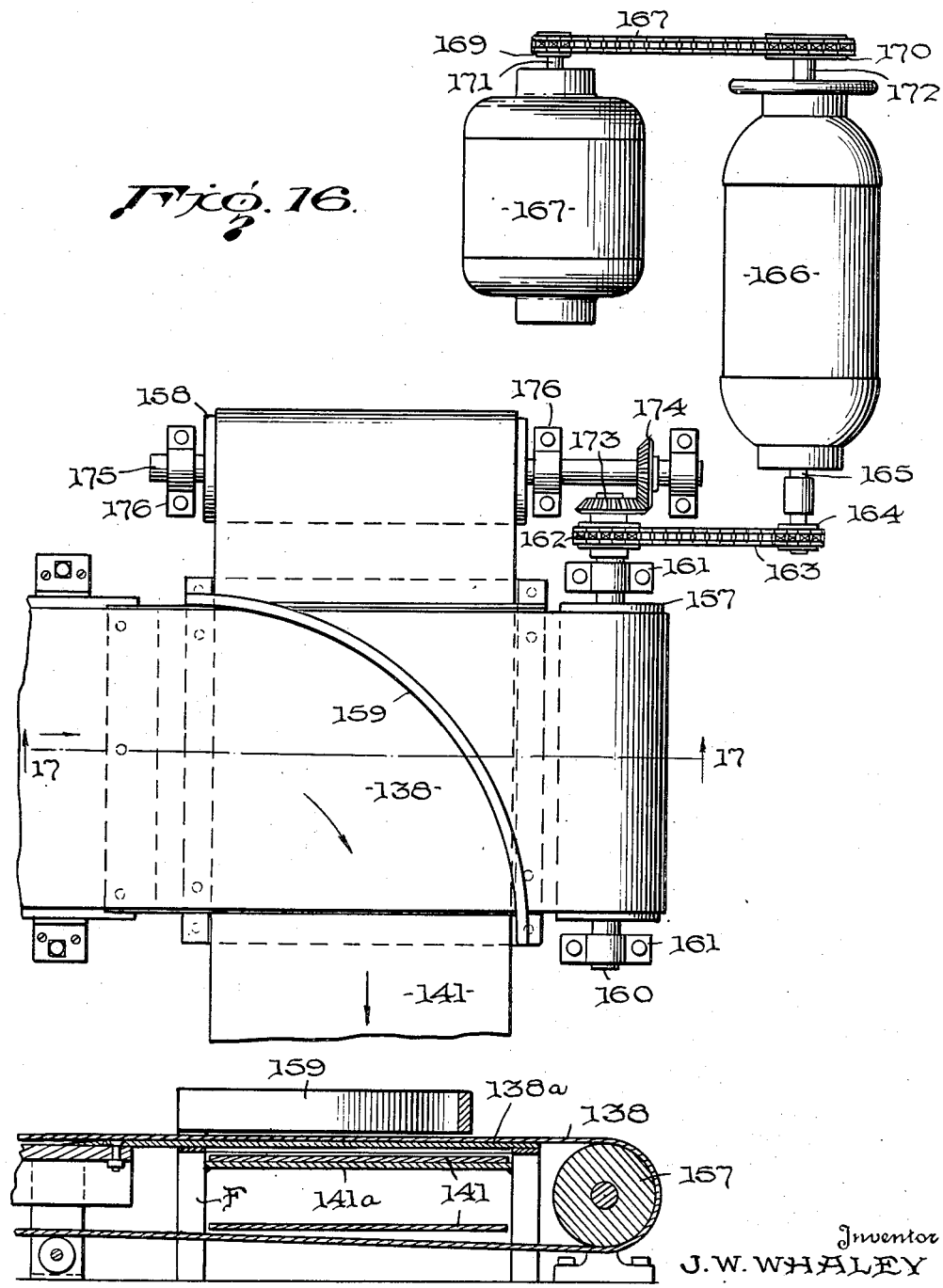

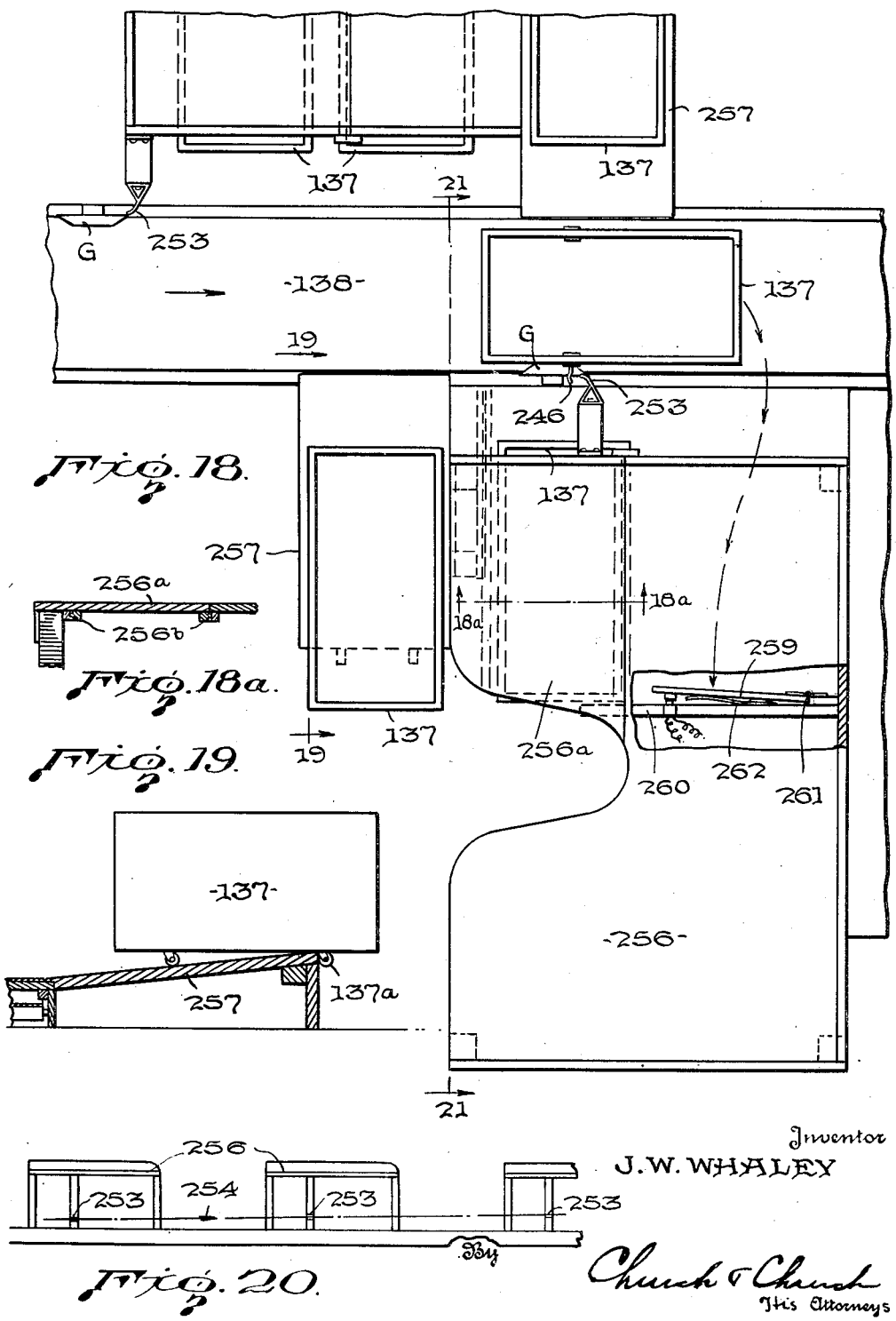

June 10, 1952
J. W. WHALEY
2,600,038
CONVEYER SYSTEM
Filed Feb. 11, 1947
18 Sheets-Sheet 11
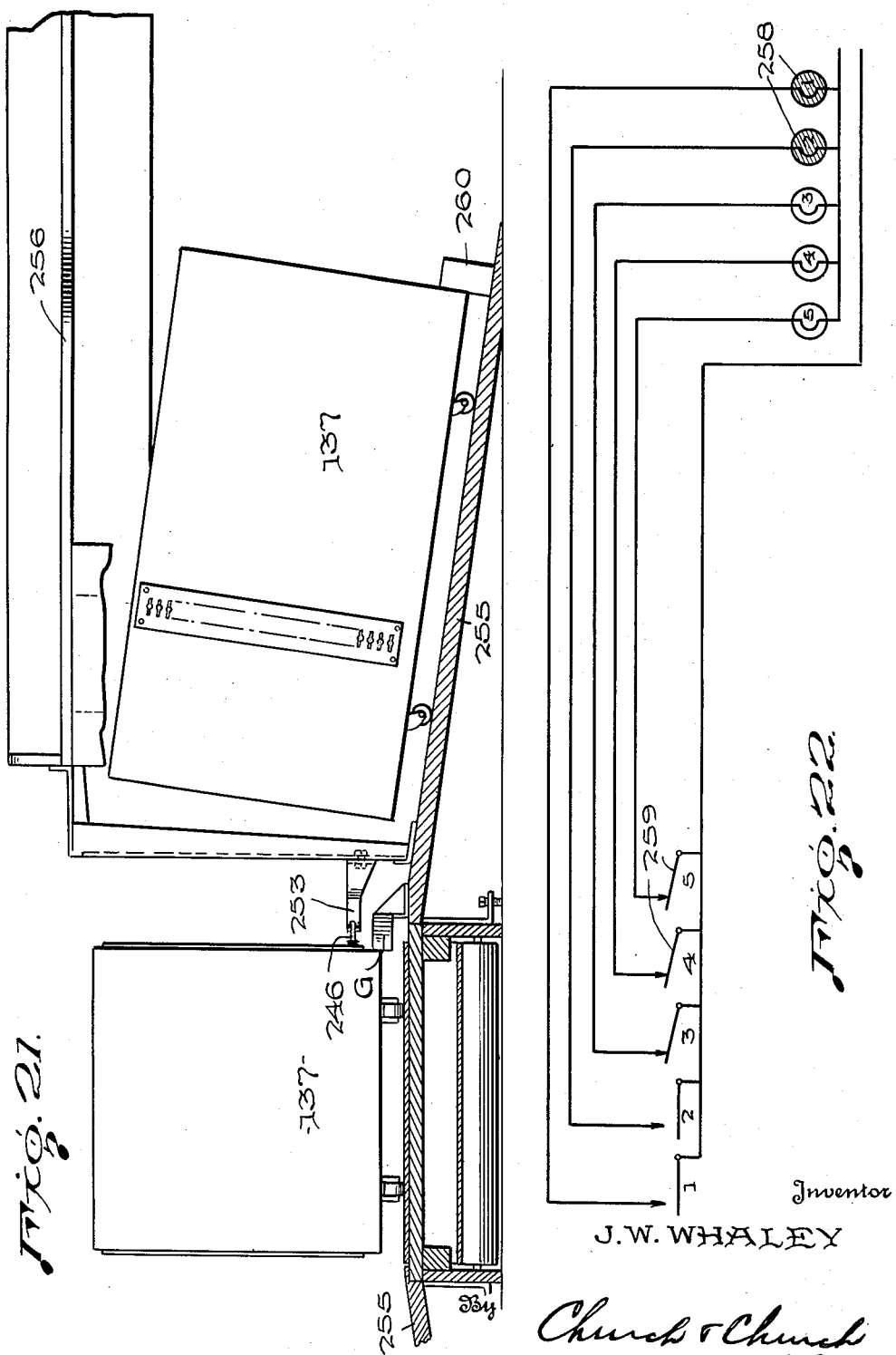
Inventor
J. W. WHALEY
By Church & Church
His Attorneys

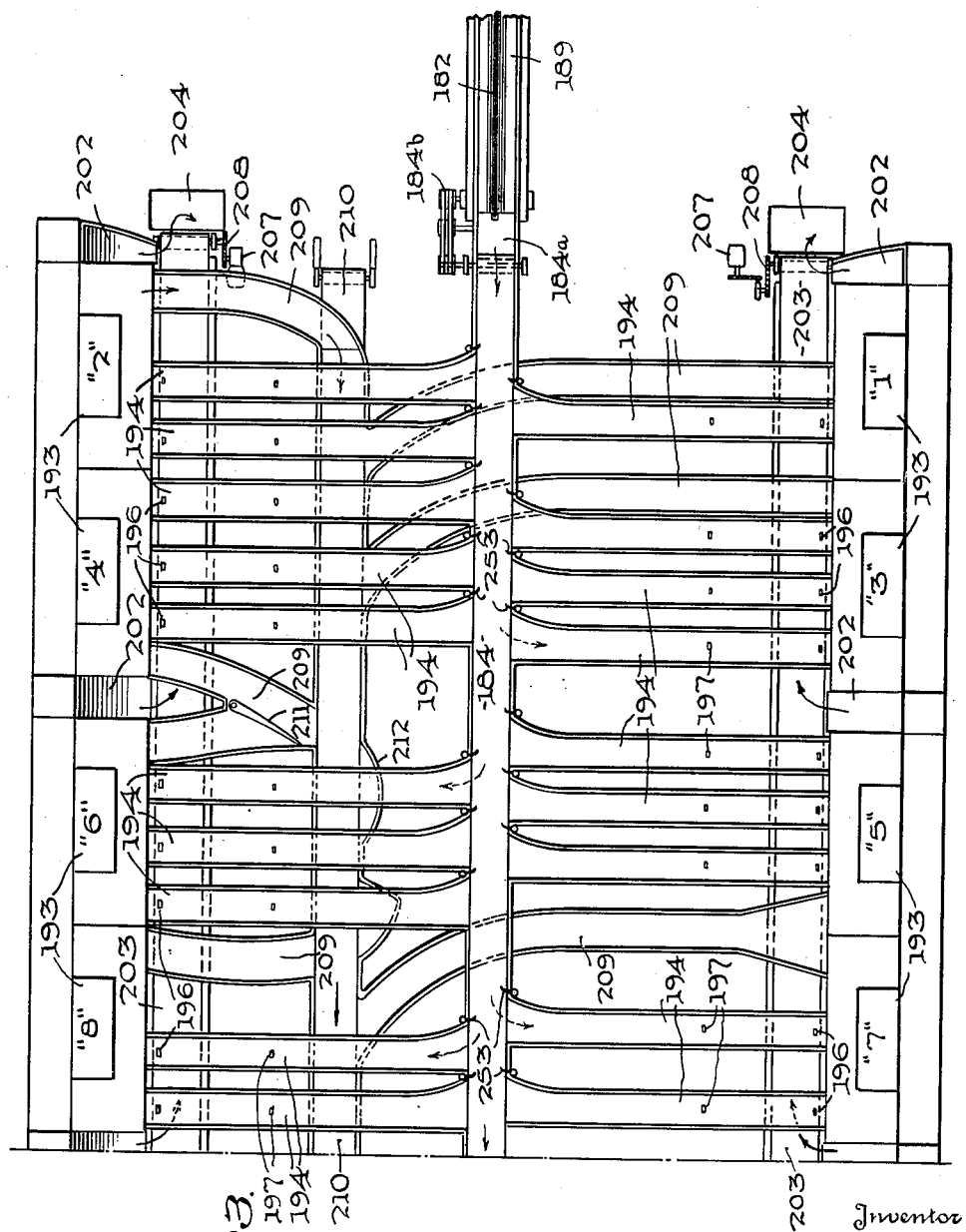

June 10, 1952     J. W. WHALEY     2,600,038
CONVEYER SYSTEM
Filed Feb. 11, 1947     18 Sheets-Sheet 13
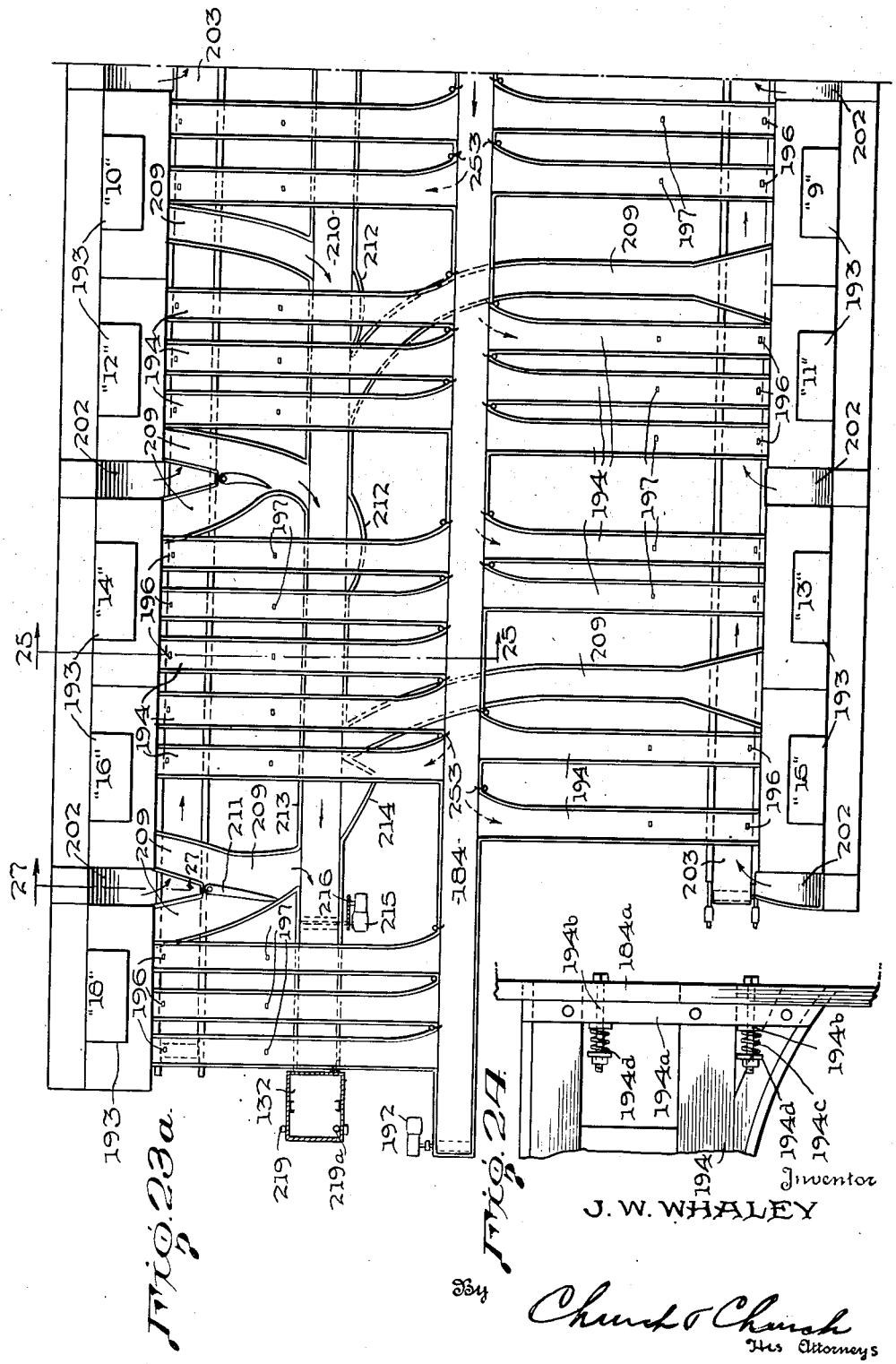
Inventor
J. W. WHALEY
By Church & Church
His Attorneys

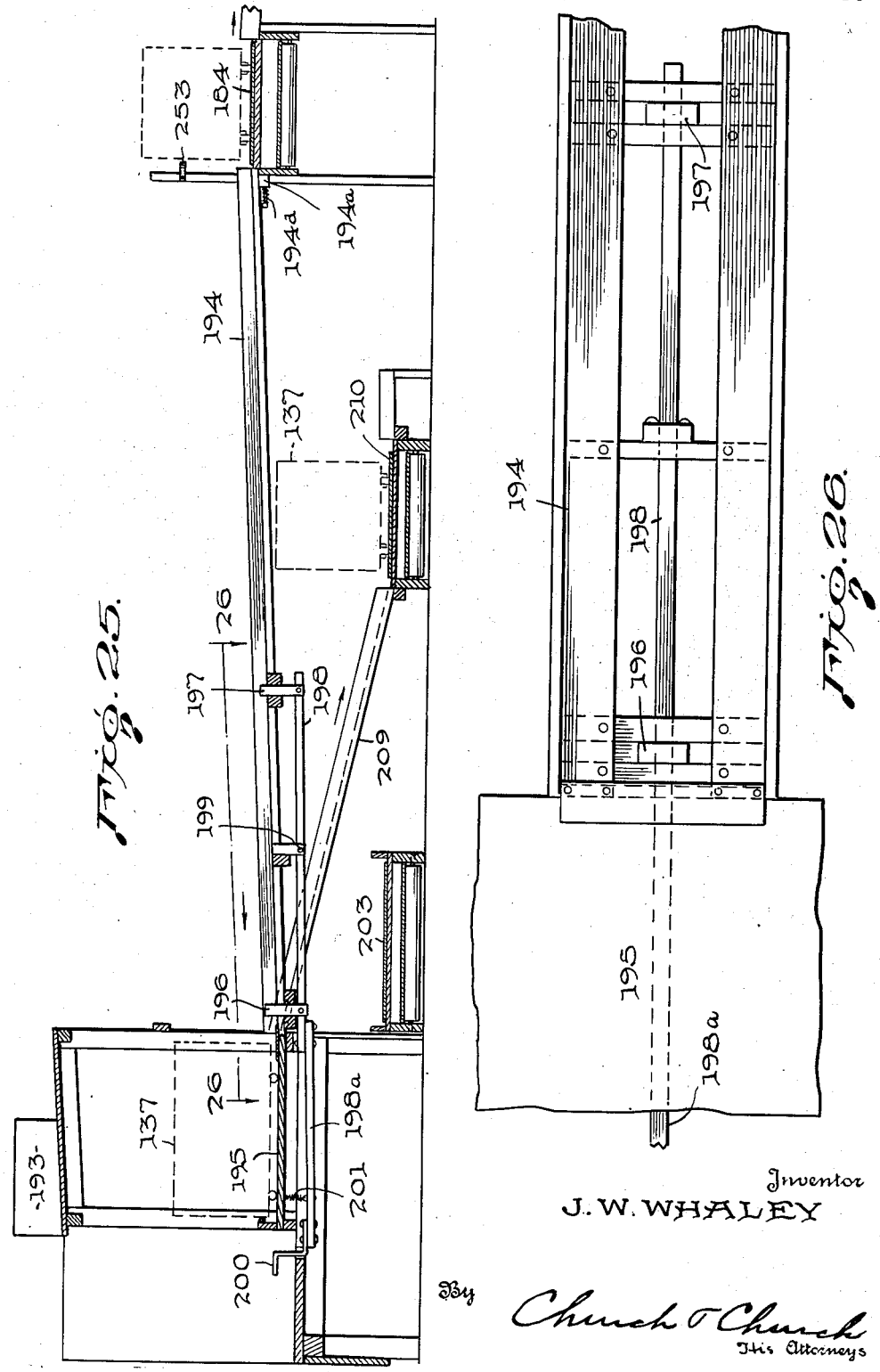

June 10, 1952
J. W. WHALEY
2,600,038
CONVEYER SYSTEM
Filed Feb. 11, 1947
18 Sheets—Sheet 15
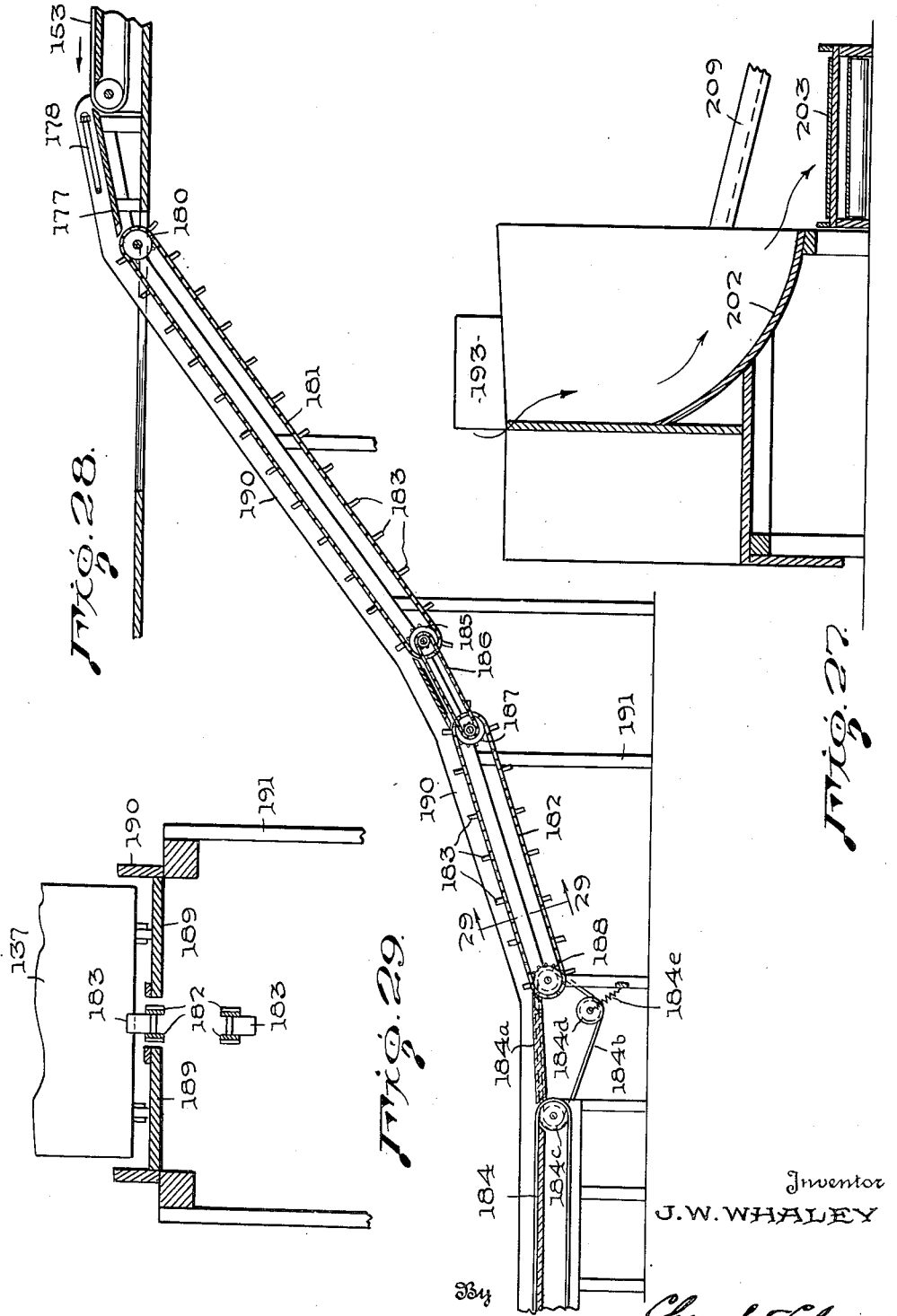
Inventor
J. W. WHALEY
By
Church & Church
His Attorneys

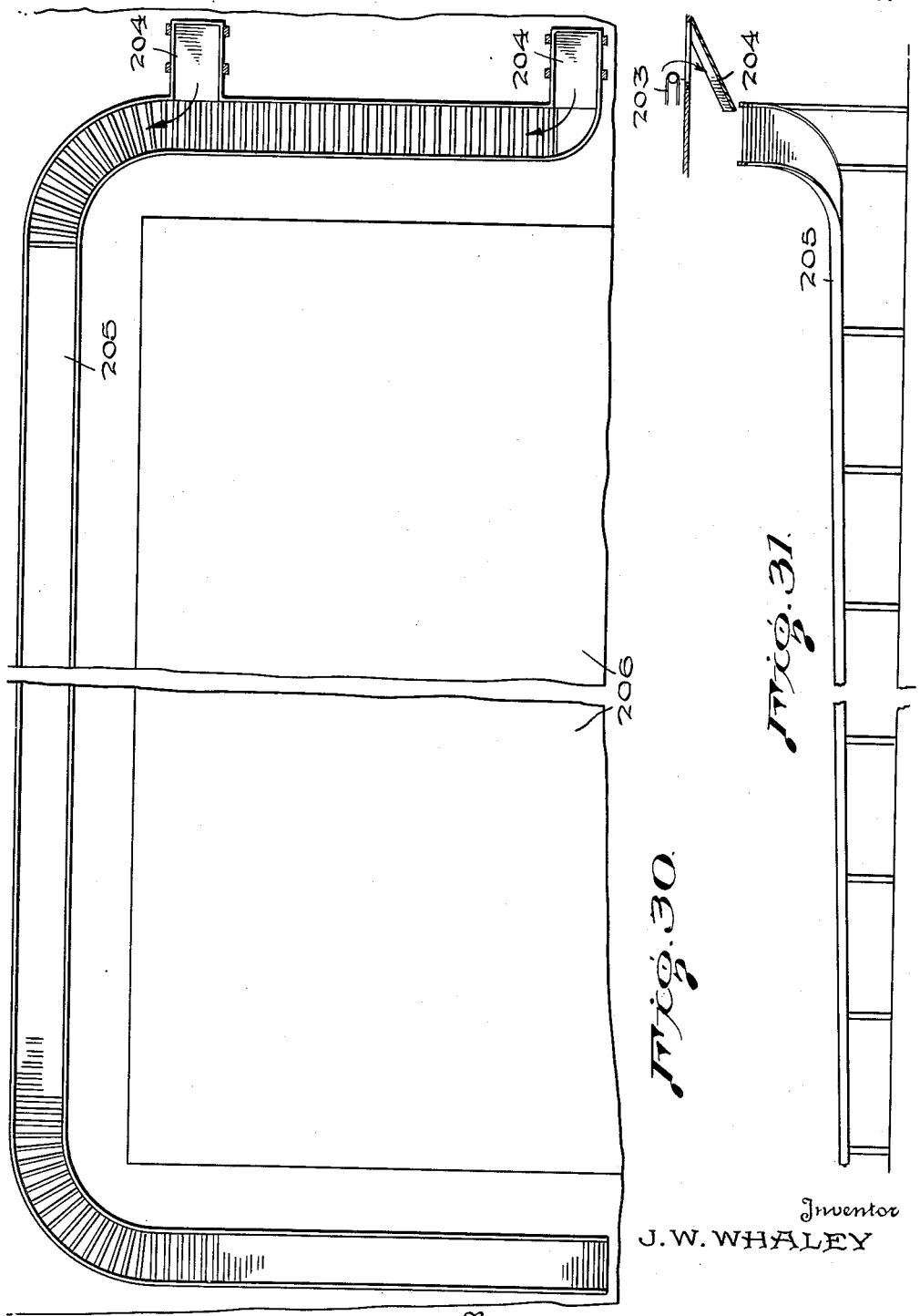

June 10, 1952 — J. W. WHALEY — 2,600,038
CONVEYER SYSTEM
Filed Feb. 11, 1947 — 18 Sheets—Sheet 17

Inventor
J. W. WHALEY
By Church & Church
His Attorneys

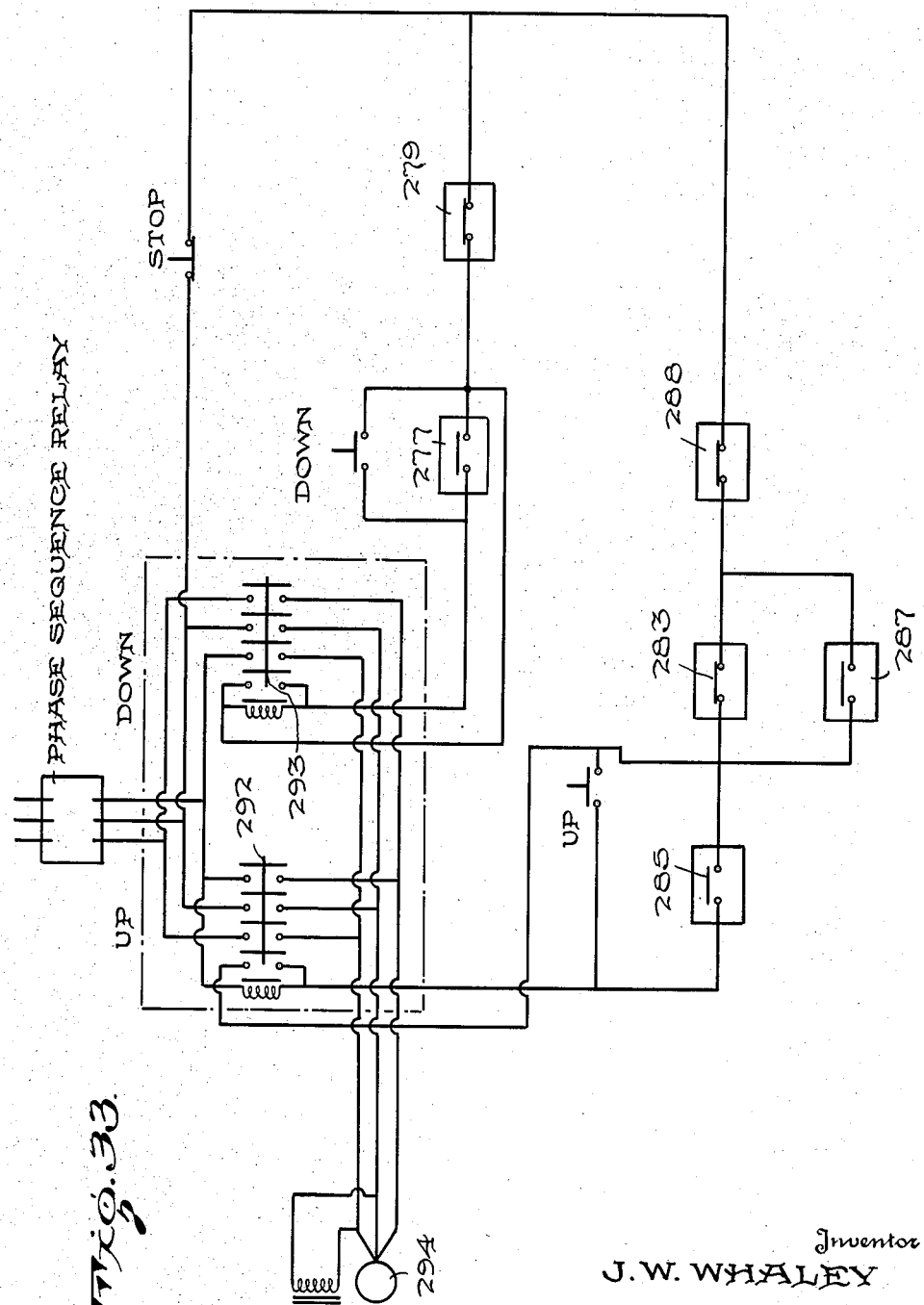

Patented June 10, 1952

2,600,038

UNITED STATES PATENT OFFICE 2,600,038

CONVEYER SYSTEM

John W. Whaley, Richmond, Va., assignor to Crawford Manufacturing Co., Inc., Richmond, Va., a corporation of Virginia Application February 11, 1947, Serial No. 727,797

18 Claims. (Cl. 198—38)

This invention relates to improvements in conveyor systems and especially to a system for conveying work receptacles or containers to and from and between successive work stations located on different floors of a building.

One object of the invention is to provide a conveyor mechanism by which work containers or receptacles stored on one floor of a building can be transported to predetermined work stations on the next lower floor and from the latter to successive predetermined work stations on said next lower floor after which they are conveyed to additional work stations on the second next lower floor and then to a storage space for completed work on the bottom floor of the building while the containers, which are then empty, are returned by automatic elevating means from said second next lower floor to the upper or first mentioned floor.

Another object of the invention is to provide a novel arrangement for the storage of work containers adjacent the point at which said containers, loaded with work, are initially placed upon the conveyor mechanism for transfer or transportation to the desired work stations.

Still another object is to provide temporary reservoirs or storage areas intermediate said work stations whereby work carrying containers, whose destinations are points beyond such intermediate storage spaces, can be accumulated in said intermediate storage areas in the event conditions at the work stations which are their destinations are such that, at the moment, additional work containers cannot be accommodated.

In connection with these original and intermediate storage or reservoir areas, the invention also contemplates the provision of signals for indicating the necessity of additional work containers being supplied to any given station. More specifically, this phase of the invention contemplates the provision of means for storing a plurality of work containers at each work station combined with means for rendering the above mentioned signal operative when the operator at a station removes the last deposited container from its original point of deposit at the station for the purpose of performing the contemplated operations on the pieces of work in that particular container. In other words, a plurality of work containers are deposited at each station and when the last deposited work container is moved from the position at which it was deposited at the station by the conveyor mechanism a signal will be rendered operative to denote the necessity of additional containers being forwarded on the conveyor mechanism to that particular station.

Another object of the invention is to provide a novel arrangement for transferring work containers from the conveyor mechanism proper to the points or work stations to which they are to be delivered, these transfer means being of such a nature that any container will be transferred or "kicked off" by the transfer mechanism at a predetermined work station.

With these and other objects in view, the invention consists in certain novel details of construction and combinations and arrangements of parts, all as will hereinafter be more fully described and the novel features thereof particularly pointed out in the appended claims.

In the accompanying drawings in which the present conveyor mechanism or system as designed for the transportation of work from the fourth floor of a building to work stations on the third and second floors, respectively, of the building from which point containers for the work are returned to the fourth floor and the finished work is packaged and transferred to the first floor for storage or shipment—

Figure 1 is a plan view illustrating more or less diagrammatically that portion of the conveyor system where the containers for the work are first deposited on the conveyor mechanism for transfer to means for lowering them to the next lower floor, this view also showing diagrammatically the elevating means by which empty containers are returned from the second floor of the building to the upper floor to be used again;

Fig. 2 is a vertical view of that portion of the conveyor system illustrated in Fig. 1, the floor of the building being shown in section;

Fig. 3 is a transverse sectional view taken on the line 3—3 of Fig. 1;

Fig. 4 is a side elevational view of one of the work containers;

Fig. 5 is a top plan view, somewhat reduced, of the work container;

Fig. 6 is an enlarged detail view of a container trip pin which is carried by each container and the end portion of a work station trip pin positioned at each station for the purpose of transferring the container from the conveyor proper to a predetermined work station;

Fig. 7 is a vertical sectional view through the shaft of the elevator by which containers are carried from the fourth, or upper floor of the building, down to the next or third floor;

Fig. 8 is a detail perspective view of the trip member which controls the movement of containers into the elevator shaft illustrated in Fig. 7;

Fig. 9 is a vertical sectional view through the shaft of the elevator by which the empty work receptacles are returned from the second floor of the building to the top or fourth floor where they again enter upon the conveyor;

Fig. 10 is a horizontal sectional view on the line 10—10 of Fig. 9;

Fig. 11 is a view taken on the line 11—11 of Fig. 9 illustrating the runway of the conveyor system at the point where empty work containers enter the elevator shaft shown in Fig. 9;

Fig. 12 is a vertical sectional view on the line 12—12 of Fig 11;

Fig. 13 is a detail sectional view on the line 13—13 of Fig. 11;

Figure 1:
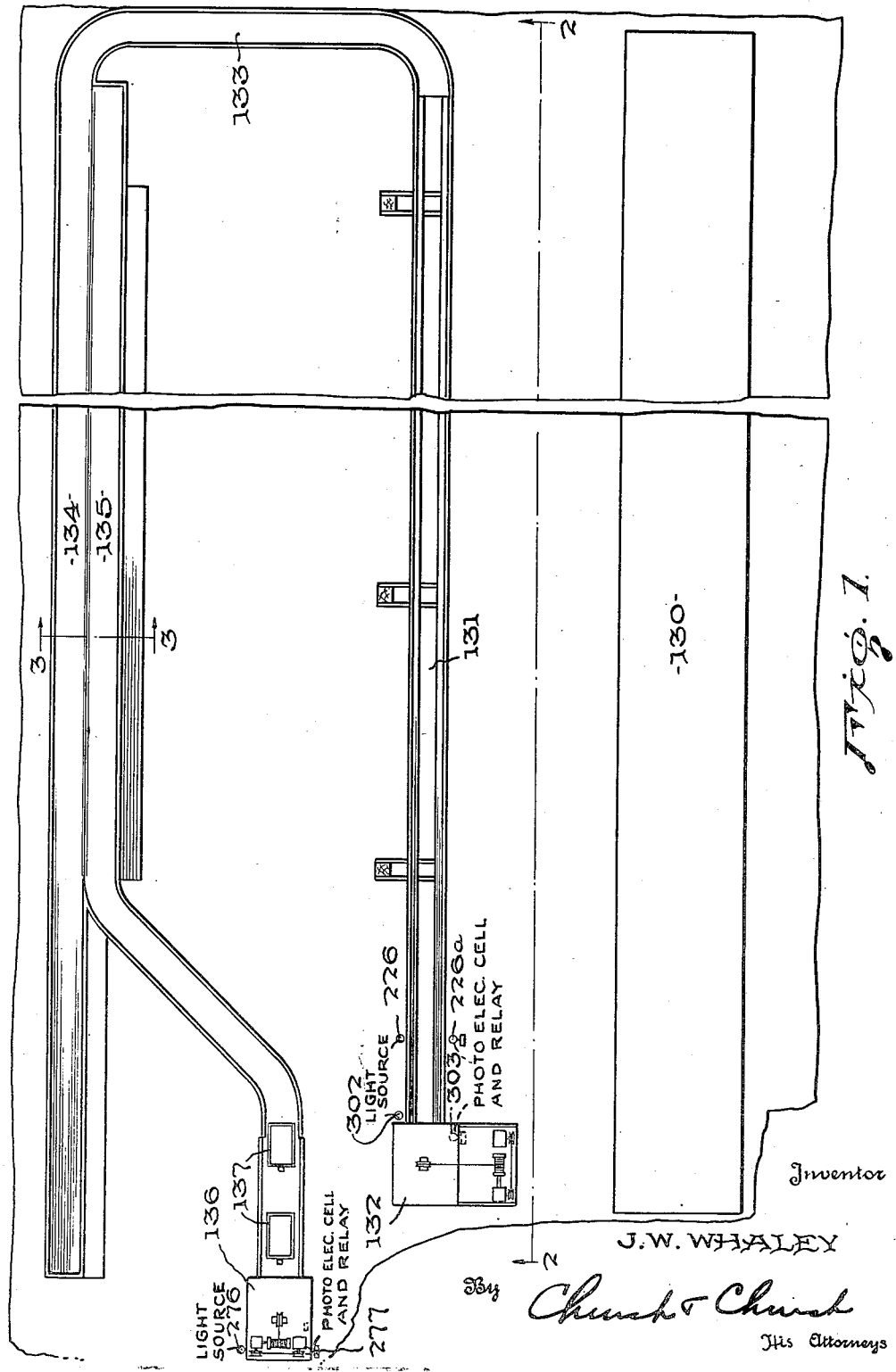
Figure 32:
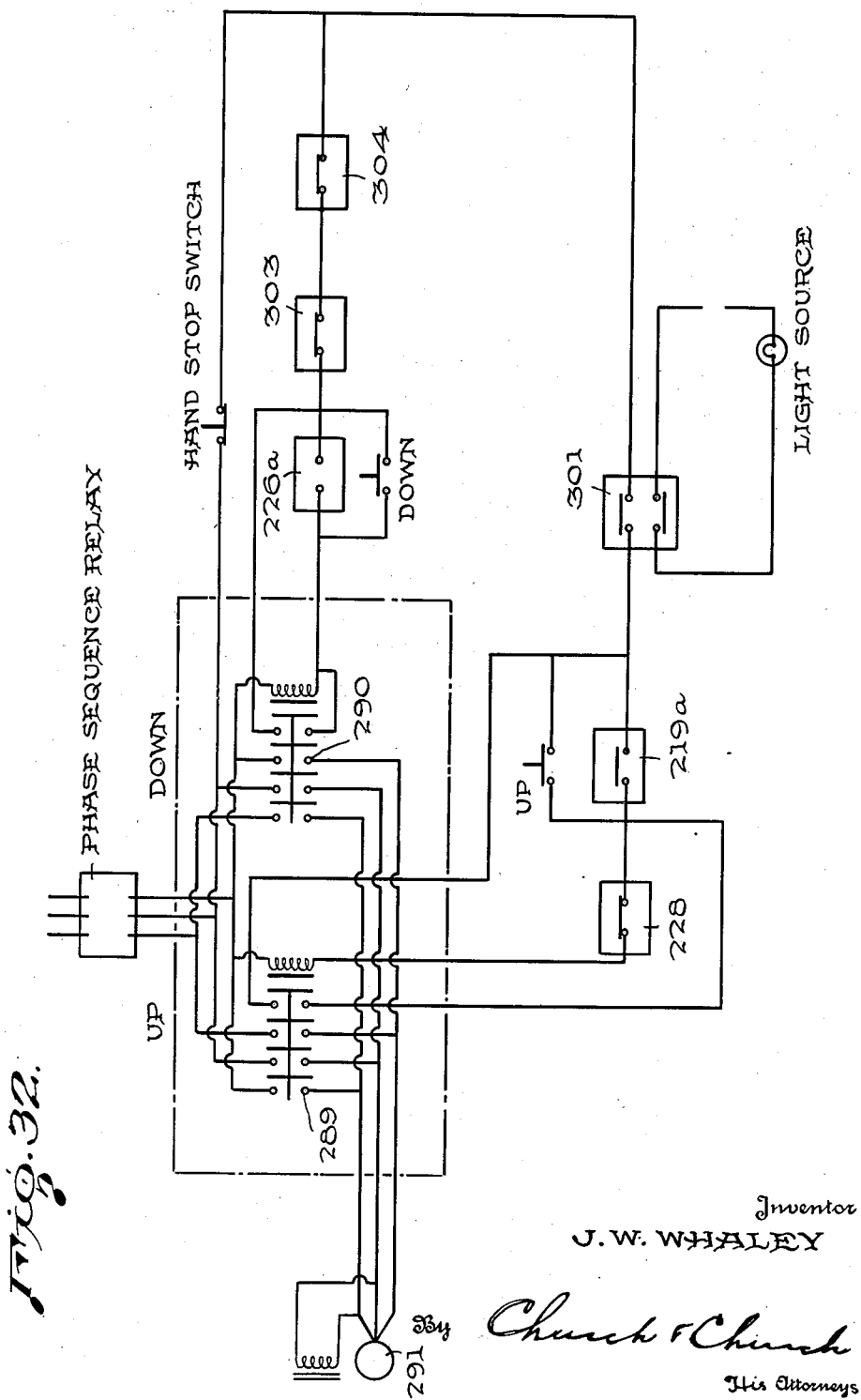

Figs. 14, 14a, taken together illustrate more or less diagrammatically a multiplicity of work stations on the third floor of the building in conjunction with endless traveling conveyors by which work containers delivered to said conveyors from the fourth floor are transferred to the predetermined stations, or from station to station, or to auxiliary reservoirs or storage spaces intermediate groups of work stations;

Fig. 15 is a detail sectional view of a braking device for retarding movement of the receptacles as they descend from the third to the second floor;

Fig. 16 is a top plan view of the ends of two endless conveyors illustrating the arrangement for changing the direction of travel of the work containers carried on said conveyors;

Fig. 17 is a detail sectional view on the line 17—17 of Fig. 16;

Fig. 18 is a plan view, partly broken away, illustrating one of the work stations and transfer of a work container from the endless conveyor to the container supporting platform of the work station, together with means for rendering a signal operative in the absence of a work container at the point at which said containers are deposited from the conveyor onto the container platform of said station;

Fig. 18a is a detail sectional view on line 18a—18a of Fig. 18;

Fig. 19 is a vertical sectional view on the line 19—19 of Fig. 18 illustrating the return ramp of an individual work station with a work container retained thereon;

Fig. 20 is a vertical view illustrating diagrammatically the relative positions of the trip members of a series of work stations which are adapted to cooperate with the work container trip pins for transferring containers from the endless conveyor to a predetermined work station;

Fig. 21 is a sectional view on the line 21—21 of Fig. 18;

Fig. 22 is a diagrammatically illustration of the signal circuits used for denoting the presence or absence of the desired number of work containers at a given work station;

Figs. 23, 23a, jointly, are a plan view illustrating diagrammatically the conveyor arrangement by which work containers delivered thereto on the second floor of the building are transferred on runways to work finishing stations where the finished work is packaged and the empty containers are started on their return movement to the upper floor of the building;

Fig. 24 is a bottom plan view of an end portion of one of the runways shown in Figs. 23, 23a;

Fig. 25 is a detail sectional view on the line 25—25 of Fig. 23a;

Fig. 26 is a sectional view on the line 26—26 of Fig. 25;

Fig. 27 is a sectional view on the line 27—27 of Fig. 23a;

Fig. 28 is a side elevational view, partly in section, illustrating the mechanism for lowering work containers from the third floor to the second floor of the conveyor system;

Fig. 29 is a sectional view on the line 29—29 of Fig. 28;

Fig. 30 is a plan view showing diagrammatically the method of conveying packaged finished work to the first or lowest floor of the building which, for convenience, is usually the point at which the packaged work is stored;

Fig. 31 is an elevational view of the structure shown in Fig. 30;

Fig. 32 is a diagrammatical illustration of the electrical connections for operating the elevator illustrated in Fig. 7 and by which the work receptacles are lowered from the upper or fourth floor to the third floor; and Fig. 33 is a similar view of the electrical connections for the elevator shown in Fig. 9 and by which the empty receptacles are returned to the upper or fourth floor.

As previously indicated, the particular design of multi-floor conveyor system selected for the purposes of the present illustration is adapted for the transportation of work containers and the work articles between the floors of a four-story building, or between four floors of a factory building, and referring to Figs. 1 to 3, the layout of the fourth or uppermost floor is illustrated as consisting of a work table 130 on which, for instance, fabrics are cut into suitable shapes for fabricating automobile seat covers. This work or cutting table 130 is located along a length of runway 131, which extends downwardly from the shaft 132 for the elevator (to be described later) which returns empty work containers to the upper floor from one of the lower floors of the building. The containers on this runway 131 are moved by gravity along the portions 131 and 133 of the runway to what will be termed a storage platform or runway 134, it being understood that these portions 131, 133 and 134 constitute a continuous inclined runway, as better illustrated in Fig. 2. The storage runway 134 actually constitutes one-half of a dual runway, the other half of the latter being indicated at 135, at which point pieces of work are loaded in the containers. The dual runway 134, 135, is inclined longitudinally toward the shaft 136 for the elevator by which the wheeled work containers, indicated at 137, are lowered to the next lower or third floor of the building. As shown in Fig. 3, this so-called dual runway constituted by the portions 134, 135, is so constructed that the two sections 134, 135, are oppositely inclined downwardly with respect to the longitudinal center of said dual runway. That is, as the containers filled with pieces of work move to the portion 134 there is no danger of their accidentally moving over to portion 135 and, consequently, the filled containers remain on the extended storage area 134 until actually transferred to the portion 135 by an operator who places them on the runway or ramp 135 to be deposited on the elevator in shaft 136 at proper intervals for lowering to the next lower or third floor of the building.

On the third floor of the building, the layout of which is illustrated in Figs. 14, 14a, the work containers 137 are discharged from the elevator shaft 136 on to conveyor means which consist of endless traveling belts which carry them to the various work stations on the third floor. The number of conveyor belts constituting this conveyor system on the third floor will depend upon the number and disposition of the various groups of machines or work stations to be served but, in the present instance, this conveyor means on the third floor consists of an endless traveling conveyor 138 along opposite sides of which there are machines or work stations, for instance sewing machines, and from conveyor belt 138 the containers move to a second angularly disposed conveyor belt 141 by which they are transferred to another endless traveling conveyor belt 142 disposed parallel to belt 138. Additional work stations are arranged along both sides of belt 142 and from the latter the containers move to another angularly disposed endless traveling belt 145 by which they are transferred to still another conveyor belt 146 arranged parallel to belts 138, 142. Additional work stations are also located at spaced intervals along this conveyor 146, and another feature contemplated by the present invention is the provision of supplemental or auxiliary reservoir or storage spaces between groups of work stations, as indicated at 149, 250 and 151. The work containers pass from the endless traveling conveyor 146 to another endless traveling conveyor 152 by which they are transferred to endless traveling conveyor 153 along which additional work stations are located, the auxiliary reservoir 151 also being located alongside of this particular belt 153 slightly in advance of the mechanism indicated at 156 for lowering the work containers from the third floor to the next lower or second floor of the building, as will be later described. As it is desired that the system be as flexible as possible so far as the number and grouping of machines or work units served is concerned, the diagrammatical illustration of Figs. 14, 14a, includes only three groups which are identified as "A," "B" and "C," and it will be understood that the number of machines or work units in each group may be varied, depending upon the type or character of the work being done. For purposes which will later appear in connection with the detailed description of the work containers or receptacles and their delivery to the individual machines, the machines of each of the groups "A," "B" and "C" are identified preferably by consecutive numerals beginning with numeral "I" in each group, as indicated in Figs. 14, 14a.

Figs. 16 and 17 illustrate the preferred arrangement for driving the several angularly disposed conveyor belts and the manner in which the work containers are caused to be transferred from one belt to the next angularly disposed belt. Taking belts 138 and 141 as an example, it will be understood that each belt is supported at its opposite ends on suitable rollers one of which serves as the drive roller for the belt. For instance, as indicated in Fig. 16, roller 157 constitutes the drive roller for belt 138 and roller 158 constitutes the drive roller for belt 141, the upper reach of belt 138 overlying the upper reach of belt 141, so that, as the containers are advanced by belt 138 into engagement with a barrier 159 of arcuate formation the containers will be gradually turned into alinement with belt 141, the moving belts continuously urging the containers forward until each container moves entirely from one belt to the next succeeding belt. Drive roller 157 of belt 138 is mounted on a shaft 160 journaled in suitable bearings 161 and mounted on said shaft 160 is a sprocket 162 connected by sprocket chain 163 to a sprocket 164 on shaft 165 of reduction gearing 166 which is driven by a motor 167 through sprocket chain 168 running on sprockets 169, 170, mounted on shafts 171, 172, of the motor 167 and reduction gearing 166, respectively. Also, mounted on shaft 160 of drive roller 157 is a bevel gear 173 in mesh with bevel gear 174 on shaft 175 journaled in bearings 176 and carrying the drive roller 158 of belt 141. Thus, power is transmitted from motor 167 to the drive rollers of the two angularly disposed belts to drive the latter at uniform speeds. As previously mentioned, the driving mechanism thus specifically described is preferably used for successive pairs of angularly disposed overlapping endless traveling conveyor belts illustrated in Figs. 14, 14a. To facilitate and insure the work receptacles "turning the corner" when they encounter the arcuate barrier 159 at those points where the receptacles pass from one belt to another angularly disposed belt, as indicated in Fig. 16, the belts are afforded additional support at such points. Preferably a metal plate 138a mounted on a suitable frame F is positioned beneath the upper reach of belt 138 where it passes over the upper reach of belt 141 and a second plate 141a welded to said frame is positioned beneath the corresponding area of belt 141. This arrangement prevents the sagging of the upper belt at the overlapping areas of the two belts and also prevents the overlapping areas of the two belts being forced into contact with each other under the load imposed on belt 138 by a receptacle filled with work. As a consequence, the upper belt exerts a positive driving or impelling force on the work filled container when the latter is in contact with barrier 159 and insures a turning motion of the container and the movement of the latter from the upper belt to the upper reach of the second or angularly disposed belt (belt 141 in the present illustration). In the case of the last belt 153, however, motion is imparted thereto by the motor 167a, and as the receptacles pass from this belt they move onto a plate or chute 177 from which they are delivered to the upper end of a continuously traveling drag chain 181 which constitutes part of the mechanism for lowering the receptacles to the next lower or second floor of the building. To minimize the speed at which the receptacles pass along chute 177, braking means in the form of braking member 178 is pivoted at 179 at the side of the chute and yieldingly urged into the path of the receptacles by a spring 180.

As indicated by the broken away portions in Figs. 14, 14a, these two figures are intended to illustrate more or less diagrammatically only a fragmentary portion of a complete layout of conveyor belts and work stations which may be utilized at this point of the present conveyor system and it will also be understood that, in the case of the production of automobile seat covers different operations are performed on the pieces of fabric from which a cover is fabricated, one of the operations being performed by certain of the sewing machines in group A along the conveyor system on the next to upper or third floor, while additional operations are performed by the other groups B and C of machines along the conveyor system on said floor. In this connection, it will also be appreciated that the work may be performed on the covers at the machines in one group more rapidly than at those of another group and, for this reason, it is necessary to provide means for controlling the delivery of work conveyors to the several groups to compensate for this differential in the rate at which work is performed on the covers at different stations. This accounts for the provision of the so-called auxiliary or supplemental reservoirs 149, 250 and 151, illustrated in Figs. 14, 14ª. For instance, if work is performed on the covers at stations in advance of auxiliary storage space 149 at a speed which will result in containers being fed to sewing machines or stations beyond storage area 149 in quantities that cannot, at the moment, be accommodated at the latter stations, an operator can remove excess containers from the traveling conveyor belt (146 in the present example) and let them accumulate in the storage area 149, retaining them in said area until the subsequent work station or stations are capable of accommodating such excess containers as indicated by a signaling system to be later described for indicating absence of work containers at any given station. Similarly, work containers in excess of the number capable of being accommodated at stations beyond supplemental reservoirs or storage areas 250, 151, are accumulated in these latter two storage areas and, if desired, a barrier 250ª may be placed across the conveyor belt 146 to divert the containers into these areas, as shown in Fig. 14ª, in lieu of manually directing the trays into those areas as previously mentioned.

In the actual installation of the present conveyor system which is being used in connection with the fabrication of automobile seat covers the actual fabrication of the cover is completed at the several sewing stations on the third floor, just described. As will be later described, each sewing machine is provided with storage or "parking" space for accommodating at least three work containers, two containing fabric to be operated upon at the particular station and a third or empty container into which the work is placed by the operator upon completion of the sewing operation at that particular station and, as each of the latter containers is filled by the operator it is returned to the endless traveling conveyor system for transportation, controlled as will be later described, until the containers carrying the finished seat covers reach the lowering means 155 (Figs. 14ª, 28, 29) by which they are lowered to the next lower or second floor of the building. At this point the containers move from chute 177 on to the first of two alined drag chains 181, 182, on which they are retained by dogs or lugs 183 on said chains until they are transferred from chain 182 along transfer platform 184ª to an endless traveling belt 184 which is located on the second floor of the building. Chain 181 is carried on sprockets 180, 185, and chain 182 is carried on sprockets 187, 188 and sprockets 185 and 187 are connected by sprocket chain 186. Sprocket 188 which supports the lower end of drag chain 182 is, in turn, connected by one or more V-belts 184ᵇ to the shaft of roller 184ᶜ on which one end of belt 184 is supported. Preferably, proper tension is maintained on belts 184ᵇ by means of a floating roller 184ᵈ and attached spring 184ᵉ (Fig. 28). The major portion of the weight of the filled containers 137 is supported on ways 189 (Fig. 29) which are spaced apart for the accommodation of the drag chains, these ways 189 being provided at their exterior edges with guards 190, and the ways themselves being supported on suitable framework 191.

Referring now to Figs. 23, 23ª, endless traveling conveyor 184 is driven by motor 192, and the receptacles filled with finished seat covers deposited on this conveyor are diverted toward work stations 193 along opposite sides of said conveyor, this diversion of the loaded containers being accomplished by a trip mechanism to be subsequently described which causes the containers to be turned and directed into inclined troughs or ways 194 which extend from opposite sides of the conveyor to said work stations 193. Troughs or ways 194 are inclined downwardly from conveyor 184 to the work stations 193, each work station being provided with a platform 195 for supporting the containers delivered thereto (Figs. 25, 26). To control the movement of the containers along the ways 194 so that the operator at each station 193 can regulate the movement of the containers to the platform 195 two stops 196, 197, spaced from each other lengthwise of each way 194 at least the length of a container, are positioned in the path of containers moving downwardly along the way 194. These two stops 196, 197, are pivotally attached to a bar 198 pivoted at 199 and adapted to be actuated by the operator by means of a foot pedal 200 mounted on an extension 198ª of the bar 198. A spring 201 normally maintains pedal 200 elevated and the stops 196, 197, in the positions shown in Fig. 25, under which conditions stop 196 will engage and retain the container on the runway while stop 197 is low enough to permit a container on the runway to clear it. However, when pedal 200 is depressed by the operator, stop 196 will be depressed to permit a container held thereby to move to platform 195 while, at the same time, stop 197 will be elevated to prevent the next succeeding container moving past it down the way 194. In other words, the next succeeding container on the runway is temporarily held by stop 197 when the latter is in its raised position but, when the pedal 200 is released by the operator, stop 197 will be restored to its normal depressed position under the influence of spring 201 whereupon the container which had last previously been engaged by stop 197 will be released and will advance down the runway until it engages stop 196, which, at that time, will have been returned to its normal elevated container engaging position. If the containers, loaded with work, move down a runway 194 at any appreciable speed considerable shock is imposed on the runway and stops 196 or 197 when the container impacts against either of said stops. Preferably, therefore, each runway has a crosspiece 194ª mounted transversely of its under surface (Figs. 24, 25) with bolts 194ᵇ extending through said cross-piece and a side rail 184ª of the supporting structure for belt 184 and springs 194ᶜ secured on each bolt between said crosspiece and enlargements 194ᵈ on the bolts. The upper end of the runway is slidably supported on side rail 184ª and is yieldingly held in the position shown in Fig. 24 by said springs 194ᶜ but, as will be apparent, shocks set up by the containers impacting against the stops will be absorbed by said springs. However, the longitudinal movement permitted the runway by the springs under these circumstances will, of course, be limited so as to prevent the end of the runway moving entirely off the rail 184ᵇ.

As each seat cover or other article is wrapped or packaged by the operator at a station 193, the packages are placed in a chute 202 down which they descend and are deposited on an endless conveyor 203 (Figs. 23, 23a, 27). There is an endless belt conveyor 203 for each bank or row of packaging stations 193 and these conveyors, in turn, deposit the packages in chutes 204 by which the packages are transferred to an inclined way 205 (Figs. 30, 31) on the lower or first floor of the building and from which the packages are taken by operators who place them in a suitable storage area or space, as indicated diagrammatically at 206. The endless conveyors 203 are actuated by motors 207 and driving connections 208, as indicated in Fig. 23.

As each container is emptied by a packaging operator at any of the stations 193 the empty container is transferred by that operator from the platform 195 to an inclined runway 209 by which the empty container is transferred to a second conveyor 210 located between and extending longitudinally of the two banks or series of packaging stations. The runway 209 may be of what is termed a single entrance type or it may be of dual entrance type whereby a single runway may accommodate empty containers being returned from two packaging stations. Where a runway 209 has dual entrances, a deflector or guard such as indicated at 211 is pivoted between the two entrances to prevent collision between containers if two of the latter should happen to be simultaneously placed in the two entrances of the runway. Empty containers descending the runway 209 engage guards or guides disposed along the sides of the conveyors 210 to insure proper positioning of the returning containers on said conveyor. For instance, curved deflector members or guards 212 are located along the side of conveyors 210 opposite certain of the runways 209 and which, when engaged by a container descending those runways will turn said containers lengthwise of the conveyor. In other instances, straight walls or guards such as indicated at 213 may be used for properly positioning the return containers on conveyor 210 while, in still other instances guard rails such as shown at 214 may be used. In this latter instance the guard rail 214 constitutes, essentially, a stop to arrest the movement of the descending container and the latter is then picked up by the conveyor 214.

Conveyor 210 may be driven by a motor 215 through suitable driving connections 216, and said conveyor transports the empty containers to the elevator shaft 132 for return to the upper floor of the building.

This return of the empty containers to the upper floor is accomplished by said containers descending a ramp 217 (Fig. 9) at the discharge end of endless conveyor 210 on the second floor of the building, the lower end of this ramp 217 being in registry with the elevator platform 218 when the latter is in its normal lower position in elevator shaft 132, so that empty containers descending ramp 217 will be deposited on said elevator platform. As previously mentioned, containers 137 transported on the endless traveling conveyors to the various work stations and storage reservoirs illustrated in Figs. 14, 14a, are adapted to be removed from said conveyors and deposited at predetermined stations. For this purpose each container is provided with a trip pin 246 (Fig. 6) which may be releasably secured in any one of a vertically extending series of openings 247 in each of the two side walls of the work containers. The openings 247, in the two sides of the container are numbered consecutively as are the work stations in the respective groups A, B and C, with the even numbered openings 247 on one side of the container and the odd numbered openings on the other, just as the several stations are arranged with respect to the conveyor belts. Each opening 247 has slots 248 merging into opposite sides thereof and these slots are adapted to accommodate a locking pin 249 carried by the trip pin 246, so that when said locking pin is in registry with the oppositedly disposed slots of one of openings 247, the trip pin can be passed through the wall of the container after which, by turning the trip pin to move the locking pin 249 out of registry with the slots 248, the trip pin will seat in a groove 249a in the inner surface of the container wall and be firmly retained in said groove by means of a spring 251a interposed between a collar 251 on the trip pin and a washer 252 loose on said trip pin. As shown diagrammatically in Figs. 14, 14a, and 23, 23a, what will be called, for convenience, station trip pins 253 are provided along the various endless conveyors on which the containers are transported at points to engage trip pins projecting from containers and remove the containers from the conveyors for deposit at the desired station (Figs. 14, 14a) or to divert said containers from the endless traveling conveyor 184 into the desired trough 194 (Figs. 23, 23a). These station trip pins 253 are all located at different elevations with respect to any one conveyor on which the containers are transported. For instance, as illustrated diagrammatically in Fig. 20, the station trip pin 253 of each successive station in the direction of movement of the conveyor, as indicated by the arrow 254, is higher than the next preceding station trip pin. In other words, a container being advanced into the direction of arrow 254 will be diverted or removed from the conveyor at the station in Fig. 20 whose trip pin 253 is at the same elevation as the trip pin carried in the side of the container. This arrangement or relationship between the trip pins of successive stations and the trip pins of the containers is carried out throughout the entire series of machines in each group of machines A, B and C along the several endless traveling conveyors.

In the case of the packaging stations shown in Figs. 23, 23a, the containers are diverted by the cooperating trip pins into the troughs 194 but, in the case of the work stations illustrated diagrammatically in Figs. 14, 14a, the containers removed from the endless conveyor are deposited on a station platform 255 (Figs. 18 and 21) which is inclined downwardly from the endless conveyor and, in the case of automobile seat cover fabricating operations this platform is located beneath the top 256 of the sewing machine (not shown). In order to insure complete removal of each container from the endless conveyor it will be observed, particularly in Fig. 6, that each trip 246 has a shank 246a which extends substantially laterally from the side of the container at a point rearwardly of the transverse center of the container. At its outer end, shank 246a has a relatively short forwardly bent hook 246b normal to the shank 246a and extending from the shank in the direction of travel of the container along the conveyor. In this way, the forward faces of the container trip pins are provided with a dished or concave surface 246c. To engage the concave surface 246c, each station trip 253 has at its outer end a lip 253a which extends in a direction opposite to the direction of conveyor travel. This combination of factors, i. e., the dished container trip pin and its location rearwardly of the container, together with the sloping runway 255, insures complete removal of a container from the traveling conveyor when its trip pin engages a station trip pin. That is, the dished surface of the pin 246 prolongs its engagement with the cooperating station trip pin while the rearward location of the container trip pin causes the forward end of the container to swing around onto the inclined runway 255 of the station, the engagement of the cooperating trip pins being of such duration that the major portion of the container has entered upon a sloping platform 255 by the time the container trip pin 246 becomes disengaged from the station trip pin 253, thus insuring the container continuing its movement down the sloping runway. The width of the runway 255 which constitutes a container supporting platform for the individual station is such that it can accommodate two containers side by side and, in addition, there is a discharge runway 257 for each sewing station on which a container is supported while being filled with pieces of work operated upon at the particular station. As shown in Fig. 19, runways 257 slope toward the endless conveyor and a depending portion of the container, the wheels 137ᵃ in the present instance, are adapted to be hooked over the upper end of the runway 257 to hold the container thereon until it is filled with pieces of work and is ready to be returned to the endless conveyor for transportation to a storage area or to the work station at which the next succeeding operation is performed. In other words, it is intended that when an operator begins the day's work there will be an empty container 137 on the discharge runway 257 of the operator station and two containers filled with pieces of work on the platform 255. As the pieces of work are removed from the filled container nearest the operator and the necessary operation performed thereon they are deposited in the container or discharge runway 257 until the latter container is filled and the one next to it on the platform 255 is empty. The filled container on runway 257 is then slightly elevated and permitted to roll down the runway onto the endless conveyor after which the two containers on platform 255 are moved forwardly, the then empty container being placed on the discharge runway and the other container brought to position where the contents thereof are accessible to the operator. Preferably, each work table top 256 has a section 256ᵉ slidably mounted in ways 256ᵇ (Figs. 18, 18ᵃ) whereby said section can be moved toward the side by the operator to facilitate removal of work pieces from a container beneath top 256.

In order that work to be operated upon will not become exhausted at a station means are provided for actuating a signal when the container last deposited on platform 255 is moved by the operator from its initial point of deposit on said platform to a point on the platform where its contents will be accessible to the operator, the actuation of this signal indicating the fact that the last deposited container has been moved by the operator so that another container full of work for that particular station can be immediately deposited on the conveyor system by an operator to whom said signal is given. This signaling arrangement is shown more or less schematically in Figs. 18 and 22, and consists preferably of a series of visible signals such as lights 258 each included in a circuit which also includes a switch lever 259, there being a light for each station with the switch lever of each circuit so located at the station that the circuit will be broken so long as the last deposited container remains undisturbed on the station container-supporting platform but, upon removal of the last deposited container from its original position of deposit on the platform said lever will be actuated to close the signal circuit for that station. For instance, as shown in Fig. 18, there is an abutment 260 at the lower edge of the station platform 255 which primarily serves the purpose of arresting downward movement of containers on said sloping platform and pivoted on this abutment 260 in position to be engaged by a container deposited on said platform from the endless conveyor is the switch lever 259 of the signal circuit for that station. As will be understood, when a container 137 moves from the endless conveyor to the sloping platform it finally comes to rest against the lever 259 at the lower edge of the platform and moves the switch lever on its pivotal center 261 to disengage the contacts of said switch, thus breaking the circuit of the signal light of the station. However, when the operator ultimately removes the last deposited container from engagement with the lever 259, said lever will be actuated by a spring 262 to reestablish engagement between the switch contacts whereupon the signal light for that particular station will again be energized. In order to avoid confusion this signaling system has not been illustrated in combination with any particular point of storage for containers carrying pieces of work but, as will be readily understood, the signals 258 can be located, for instance, on the upper floor at a point visible to an operator in charge of filled containers accumulated on the reservoir runway 134. This would be true of the signal system for those stations at which the first operation is performed on the work so that additional containers could be transferred from storage runway 134 to runway 135 with the trip pin of the containers set to coact with the stations indicated by the energized signals visible to the operator in charge of the containers in storage area 134. Likewise, in the case of stations in the group B of work stations beyond auxiliary storage area 149 (Fig. 14) the signals for such stations as these would be visible to an operator in charge of containers accumulated at storage area 149, and the same would be true in the case of stations in group C beyond auxiliary reservoir 150. For instance, as shown in Fig. 14ᵃ, the signals 258 might be arranged on a suitable support 263 adjacent the auxiliary reservoir 150 and similar arrangements could be used in conjunction with the other areas provided for storage of accumulated work containers.

Before describing, in detail, the structure and operation of elevators 132 and 136, a brief summary of the normal movement of a container through the present conveyor system will first be given. Assuming a container 137 is to first be delivered to work table "No. 6" in group A (Fig. 14), the operator on the fourth floor will insert trip pin 246 in the correspondingly numbered opening 247 in the container and places the latter on runway 135 by which it is delivered to elevator 136. The container is then carried down to the third floor by the elevator and discharged on to belt 138 by which it is carried along until the container trip pin engages the trip pin 253 of work table "No. 6" whereupon the container is swung around on to the platform 255 under table "No. 6." Later, when the operator at work table "No. 6" is ready to put the container back on conveyor 138 for conveyance to, say work table "No. 8" of group B, the container trip pin is inserted in the correspondingly numbered opening 247 and the container returned to the conveyor which will transport it to that station in group B, at which point the container will again be removed by the trip pin 253 of said station "No. 8." If operator at table "No. 6" desires to send the container to storage area 149, instead of a work station in any of the groups, the container trip pin is not inserted in any of openings 247 but is simply laid on top of the work in the container. By thus positioning the container trip pin 246 in the proper opening 247, the container can be sent to desired succeeding work stations along the conveyor system until it reaches one of the packaging stations 193 after which it is delivered by conveyor 210 to elevator 132 which returns it to the uppermost floor of the system. It will be understood that the trips 253 of the packaging stations 193 are also arranged at different elevations and that said stations are numbered successively as are the units in the other groups of work stations so that the containers can be directed to the desired packaging stations.

The elevator 136 by which the containers are lowered from the top or fourth floor to the conveyors on the next lower or third floor is illustrated in more or less detail in Fig. 7. As the elevator platform 265 is raised to its upper position, as shown in full lines in Fig. 7, it engages the extremities of extensions 266 on one end of a lever 267 whose opposite end is connected by a link 268 to a lever 269 pivoted at 270 below runway 135. Lever 269 carries two stops 271, 272, and when the elevator platform is not in its upper position a spring 273 causes stop 271 to be projected above or through runway 135, while stop 272 is held substantially flush with the surface of said runway. With stops 271, 272, in these latter positions a container approaching the elevator shaft would be engaged and held by the upwardly projecting stop 271 but when lever 267 is rocked by the elevator platform engaging the extensions 266, the lever 269 is rocked to the position shown in Fig. 7, so that the container which had previously been held on the runway by stop 271 can roll on to the elevator platform. At the same time, the next succeeding container will be engaged by stop 272, as shown in dotted lines in Fig. 7, to prevent this succeeding container interfering in any way with the operation of the elevator, as will be later appreciated. However, when the elevator platform is lowered and stop 271 again raised and stop 272 lowered the so-called next succeeding receptacle will then move down runway 135 into engagement with the stop 271 where it will be held until the elevator platform is again returned to its uppermost position. The elevator platform 265 is preferably provided with an upstanding flange at its rear and two opposite sides and is also preferably pivoted at 274 in a frame 275, so that it can tilt slightly to facilitate entry of the container 137 thereon and when the container has fully entered upon the platform it intercepts a light source 276 associated with a photo-electric cell and relay 277 (Fig. 1) which effects the closing of a circuit for rendering operative the motor by which the elevator is operated. Thus the elevator is lowered and as it approaches the bottom of the shaft at the next lower floor a cam 278 attached to the elevator frame contacts a limit switch 279 which, as will be described in connection with the electrical diagrams, deenergizes the motor. As the elevator approaches its lowermost limit of movement a projection 280 mounted on the platform 265 engages an abutment 281 which causes the platform to tilt forwardly on its pivot 275, whereby the container on the elevator platform will roll by gravity on to a stationary platform 282 and from the latter on to the conveyor belt 138. Within the elevator shaft near the front thereof there is a photo-electric cell and relay 283 with which there is associated a light source 284 positioned outside and at the opposite side of the elevator shaft. Also, at a distance from the elevator shaft equal to the length of a container 137 there is a photo-electric cell and relay 285 and an associated light source 286 at opposite sides of the platform 282. When the beam of light source 284 is intercepted the electric circuit for the elevator motor is broken so that whenever there is a container within the shaft while the elevator is in its lower position it is impossible for the elevator motor to be energized. However, when the container 137 moves out of the shaft and completely clears the shaft it intercepts the beam of light source 286 which closes the motor circuit and starts the elevator upward. As the empty elevator starts upward its frame will interrupt the beam of light source 284 which would ordinarily stop the motor but this difficulty is overcome by shunting the circuit through a switch 287 which is actuated by the cam 278 on the elevator frame. In other words, the operation of switch 287 counteracts the effects which would otherwise result by the elevator platform breaking the beam between light source 284 and photo-electric cell 285 which should normally not be broken in order to insure against the elevator motor being energized prematurely when the elevator is in its lower position as previously mentioned. After each container has rolled clear of the elevator shaft on to platform 282 it breaks the beam of light source 286 and this results in the elevator motor being energized to return the elevator to its uppermost position, the motor being next deenergized by cam 278 engaging a switch 288 which breaks the motor circuit and causes the elevator platform to stop at its proper uppermost position.

The entry of the empty work containers into the shaft of elevator shaft 132 and the carrying of said containers upward from the second floor to the fourth or top floor is best illustrated in Figs. 9 to 13. Referring to Fig. 9, the flanged elevator platform 218 which is pivoted at 220 in its supporting frame 221, is illustrated in its upper position where it discharges the empty containers on to the runway 131 on the upper floor. In its lower position, said platform 218 will be in registry with runway 217 on the second floor of the building, and a container passing from said runway 217 on to the elevator platform will intercept the beam of a light source 219 associated with a photo-electric cell 219a (Fig. 23a) which will result in the closing of the circuit of a motor by which the elevator is operated to move the elevator carrying the container to the uppermost floor. As the elevator approaches its uppermost position, the platform is tilted, as shown in Fig. 9, by means of levers 222, pivoted at 223, at opposite sides of the platform frame 221, these levers being pivotally attached to links 224 which, in turn, are pivotally attached to the platform frame, so that, when said levers engage camming surfaces 225 during the final upward movement of the elevator, the platform will be tilted to permit the container to roll off and on to the runway 131. As the elevator approaches its uppermost limit of movement a cam 300 on the elevator engages a limit switch 301 to break the motor circuit and stop the elevator. The empty container then rolls off the tilted platform and intercepts the beam of light source 226 associated with photo-electric cell 226ᵃ which functions to actuate a reversing switch under which circumstances the elevator motor is again energized to lower the elevator until the platform or platform frame engages a projection 227 near the bottom of the elevator shaft 132 and is stopped by cam 300 engaging a limit switch 304.

As it is possible that empty containers might accumulate on runway 131 in such numbers, that the last container discharged from elevator 132 cannot move entirely past and clear of the beam of light source 226, under which circumstances the elevator would start its downward movement as soon as it reached its upper position at the fourth floor without allowing time for the container carried thereon to be discharged, the control circuit for reversing the motor includes in addition to the light source 226 and cell 226ᵃ, a second light source 302 and a second photo-electric cell and relay 303 with light source 302 located just outside the elevator shaft and the cell 303 located within the shaft at the side opposite said light source at elevations where the beam will be broken by an empty container on the elevator platform. This arrangement is such that the motor cannot be energized to start the elevator down so long as the beam of light source 302 is broken or, in other words, until an empty container carried up by the elevator has cleared the beam of light source 302 and moved entirely off the platform to break the beam of light source 226.

Safety means are also provided at the entrance to shaft 132 on the second floor to prevent the motor of this elevator being energized until a container has fully entered the shaft when the elevator platform is in its lower or second floor position. These means comprise a main control switch 228 which is included in the elevator motor circuit, said switch being located adjacent runway 217 at the entrance to the elevator shaft where it will be engaged by an empty container moving from said runway on to the elevator platform. This switch 228 is actuated by an operating lever 229 which is normally yieldingly held in circuit closing position, as shown in Fig. 11, but as a container descending runway 217 moves into the elevator shaft it moves lever 229 to the left (as viewed in Fig. 11), and the motor circuit is broken or interrupted. Thus, the elevator motor cannot be energized before a container entering the shaft 132 reaches a position entirely within the elevator shaft and properly positioned on the elevator platform. In other words, a container entering the elevator shaft engages a switch lever 129 and interrupts the motor circuit, this condition being maintained until the container has fully entered the elevator shaft. Consequently, even though the beam of photo-electric cell 219 has been interrupted for initiating upward movement of the elevator platform, such movement cannot begin until the container has cleared switch lever 229 so as to permit the latter to return to its normal circuit closing position. The presence of switch 228 also prevents upward operation of the elevator if, by chance, a second container should accidentally follow a preceding container too closely. The actuation of this main control switch 228 by a container engaging the switch lever 229 as said container enters the elevator shaft also interrupts the circuit to terminate operation of the elevator motor in the lowering of the elevator platform. However, as previously indicated, movement of a container down runway 217 to a position to engage and actuate switch lever 229 is dependent upon the descending elevator platform 218 engaging and depressing member 227. This is accomplished as follows: Member 227 is mounted on a frame 231 pivoted at 232 on the runway 217 and a cross member 233 carried by the frame 231 has mounted thereon a plate 234 which is pivoted at one end at 235 and whose opposite end is offset upwardly, as at 236. Also pivoted at 237 near the lower extremity of runway 227 are a pair of plates 238 on which a container is supported at the lower end of the runway. These container-supporting plates 238 are connected by a cross strap 239 which underlies plate 234 and engages a cam roller 240 carried in one end of a frame 241. Frame 241 is pivoted intermediate its ends at 242 and, at its end opposite cam roller 240, said frame is provided with a stop 243 which projects upwardly through an opening 244 in runway 217. Under normal conditions there will be an empty container 137 positioned on the pivoted plates 238, under which circumstances the weight of the container will depress the strap 239 and cam roller 240 so as to raise stop 243 to a position where it will engage and retain the next succeeding empty container. Also, the depression of container-supporting plates 238, as just described, causes the container positioned thereon to engage and be held by the upturned end of plate 234 which, as mentioned, is carried on the cross bar 233 of frame 231. Thus, the container positioned against stop 236 cannot move into the elevator shaft nor can the next succeeding container descend runway 217 until released by stop 243. However, when the elevator platform descends and depresses member 227 which is carried by frame 231 stop 236 is removed from the path of the container which had been held thereby so that said container can enter the elevator shaft, thus engaging operating lever 229 of main control switch 228 to interrupt the elevator motor circuit, as previously mentioned. Also, as this particular container enters the elevator shaft the pivoted container-supporting plates 238 are relieved of their load so that pressure on cam roller 240 is, in turn, relieved and frame 241, together with stop 243, is actuated by a spring 245 to move stop 243 out of the path or out of engagement from the next succeeding empty container. This next succeeding container will then move down the way 217 to a position on plates 238 whereupon stop 243 will again be raised to intercept the next container descending runway 217. Also, in the meantime, the elevator platform having started its upward movement, stop 236 will be in position to engage the container then standing on the plates 238.

The wiring diagrams for elevators 132 and 136 are shown in Figs. 32 and 33, respectively. In Fig. 32, there is shown a reversing magnetic switch having the two groups of contacts 289, 290, connected to a power source and motor 291 for the elevator 132. To prevent simultaneous actuation of the two groups of contacts at the same time, the switch comprises an interlocking arrangement but as the latter forms no part of the invention it is neither shown nor described in detail. As previously described when a container is fully entered from runway 217 on to the platform of elevator 132, the beam for cell 219a is broken and, assuming switches 228 and 301 are closed, the contacts of group 289 are closed and motor 291 engaged by three-phase power for raising the elevator until limit switch 301 is opened which breaks the motor circuit and stops the upward movement of the elevator. Then as the container rolls off the elevator and breaks the beam of cell 226a, the group of contacts 290 is actuated and three-phase current, with one phase reversed, is applied to the motor to lower the elevator until switch 304 is opened by cam 300 carried on the elevator frame. As shown in Fig. 32, switch 303 is normally closed because, as previously described, this switch will be opened by the beam of light source 302 being broken by a container moving out of the elevator shaft so that the circuit for again lowering the elevator cannot be closed until the container has cleared the shaft and said light beam to permit switch 303 to assume its normal closed position.

The wiring for the elevator 136, as shown in Fig. 33, is quite similar to that for elevator 132. It comprises a reversing magnetic switch having the two groups of contacts 292, 293, connected to the source of power and the elevator motor 294. In this instance, when the container 137 has fully entered shaft 136 at the fourth floor, the beam controlling the photo-electric unit 277 is broken and the control circuit through contact group 293 is established for energizing the motor and lowering the elevator until limit switch 279 is opened by the cam 278 on the elevator. When the elevator has stopped and after the container has fully cleared the elevator platform and shaft, the beam of light for photo-electric unit 285 is broken by the container and, the three-phase power, with one phase reversed, will be applied to the motor through contact group 292 to raise the elevator until limit switch 288 is activated by cam 278. As shown in Fig. 33, unit switch 287 which is closed by cam 278 as the elevator starts upward, will shunt the current around photo-electric unit 283 at the time the beam of this unit from light source 284 is broken by the rising elevator platform and frame. As will be understood, the use of the group contacts provides means for establishing a holding contact through each group while the same is operative in order that the motor, once started, will continue to operate until stopped by one of the several limit switches which are actuated by the cams carried by the elevators. Otherwise it would be necessary to maintain the starting device in operative condition to keep the motor energized, a condition which could not well be maintained for instance in the case of photoelectric unit 277 whose beam must be broken to energize the motor and start the elevator down. That is, after the elevator had descended to a point where the container carried thereon no longer intercepted that light beam, the unit 277 would be conditioned to break the motor circuit. Hence the use of the so-called holding contacts.

It will be apparent that the wheeled containers 137 are free to move laterally of the various conveyors and hence it is desirable to provide means for insuring proper inter-engagement between the container trip pins and trip pins at the various work stations. Preferably guide members in the form of blocks G having beveled end faces engageable by the advancing containers, are located at points along the conveyors where they will shift the container laterally of the conveyor, when necessary, to cause the container trip pin to pass through the vertical planes in which successive station trip pins are located. In other words, there is a guide block G located in advance of each station trip pin but at the opposite side of the conveyor from the station trip pin so that, as the container approaches each work station, it will be shifted laterally toward the work station (provided it is too far toward the opposite side of the conveyor as it approaches the station) and, as a consequence, if the trip pins of the container and station are located in the same horizontal plane or at the same elevation, they will be certain to move into proper engagement to remove the container from the conveyor.

What is claimed is:

1. In a conveyor system, the combination of an endless traveling conveyor, a plurality of work stations disposed along the side of said endless conveyor to which work containers are conveyed by said endless traveling conveyor, a work container supporting surface for each work station, and means for removing work containers from said conveyor and transferring them to the work supporting surfaces of predetermined work stations, said last mentioned means consisting of a trip at each work station with said trips disposed at different elevations for the several stations and a cooperating trip on each container engageable with the trip at a selected work station to bodily swing the container about the work station trip onto said work container supporting platform, the work container trips projecting from the side of the container and being adjustable vertically of the container for determining the station at which the individual container will be removed from the endless traveling conveyor.

2. In a conveyor system, the combination of an endless traveling conveyor, a plurality of work stations disposed along the side of said endless conveyor to which work containers are conveyed by said endless traveling conveyor, a work container supporting surface for each work station, and means for removing work containers from said conveyor and transferring them to the work supporting surfaces of predetermined work stations, said last mentioned means consisting of a trip at each work station with said trips disposed at different elevations for the several stations and a cooperating trip on each container, the work container trips projecting from the side of the container at a point rearwardly of the transverse center of the container to engage the trip at a selected work station and bodily swing the container about the work station trip onto said work container supporting surface, said container trip being adjustable vertically of the container for determining the station at which the individual container will be removed from the endless traveling conveyor.

3. In a work conveyor system, the combination of an endless traveling conveyor, work stations disposed along the side of the endless conveyor and to which work containers are transported by said conveyor, each work station having a supporting surface of a size to accommodate a plurality of work containers, means for transferring the work containers from said conveyor on to the work supporting surfaces of the work stations, an electrically operated signal, a control switch for said signal, a switch lever in the path of a container delivered from said conveyor onto said supporting surface and engageable by the last work container delivered to said supporting surface for opening said switch and rendering said signal inoperative; and means for closing said switch when the last delivered work container is moved on said supporting surface and disengaged from said switch lever.

4. In a work container conveyor system, a plurality of containers, an endless traveling conveyor, work stations disposed along the side of said conveyor, a pair of oppositely inclined chutes for each work station one sloping downwardly away from one edge of said conveyor and the other sloping downwardly to the same edge of said conveyor, means for transferring work containers from the conveyor to the chute sloping away from the conveyor, said last mentioned chute being of a width capable of accommodating a plurality of work containers, and means depending from each container adapted to interlock with the end of the other chute remote from the conveyor for retaining a container on said chute until released by the operator at the station.

5. In a work container conveyor system, an endless traveling conveyor, work stations disposed along the side of said conveyor, a container receiving platform for each station extending from one edge of said conveyor, means for transferring containers from the conveyor to said platform, said platform being of a width sufficient to accommodate at least two of said containers side by side, a return chute for each work station inclined downwardly to the same edge of said conveyor on which work containers are returned by the operator to said endless conveyor, said work containers being shiftable by the operator from the receiving platform to said discharge chute, and a signal normally rendered inoperative by the last container deposited on said receiving platform from the conveyor, said signal being rendered operative by the removal of the last deposited container from the point at which it is initially deposited on said receiving platform.

6. In a work container conveyor system, the combination of an endless conveyor, work stations including receiving platforms disposed along the side of said conveyor, selective delivery means settable for discharging certain containers onto said platforms at specified stations, work container storage areas intermediate certain of said work stations, and means for transferring all containers from said conveyor to said storage areas for temporary storage of work containers whereby containers being conveyed to work stations beyond said storage spaces from points in advance of said storage spaces and in excess of the capacities of the work stations beyond the storage areas can be accumulated on said storage areas and said selective delivery means may be set.

7. In a multi-floor conveyor system, the combination of a longitudinally inclined way on the upper floor, lowering means to which work containers are delivered from said way for delivery to the next lower floor, an endless traveling conveyor on said next lower floor to one end of which said containers are delivered from said lowering means, work stations on said next lower floor disposed along the side of said endless conveyor, means for removing work containers from said conveyor and depositing them at predetermined work stations on said next lower floor, return ramps at said work stations on which containers are returned to said conveyor, a second lowering means to which said returned containers are delivered at the opposite end of said conveyor and by which said containers are transferred to the second next lower floor, an endless traveling conveyor on the second next lower floor, work packaging stations on said second next lower floor, means for transferring containers from said conveyor to said packaging stations on said second next lower floor, an elevator operable between said second next lower floor and upper floor, a second endless conveyor on said second next lower floor for delivering empty containers to said elevator at said second next lower floor for return to the upper floor, chutes for returning empty containers from said packaging stations to the second conveyor on the second next lower floor, and means for delivering packaged work from the packaging stations to the third next lower floor.

8. In a conveyor system, the combination of an endless traveling conveyor, a plurality of work stations disposed along the side of said conveyor to which work containers are transported by said conveyor, a work container receiving platform for each work station disposed at an angle to the conveyor and sloping downwardly therefrom, and means for removing work containers from said conveyor and transferring them to said container platform, said last mentioned means consisting of a trip at each work station with the trips of different stations disposed at different elevations, the respective station trips being located at a point in advance of the respective station work platforms, and a cooperating trip on each container projecting from the side thereof engageable with the trip at a selected work station to bodily swing the container about the work station trip onto said work container receiving platform, the work container trips being adjustable vertically of the container for determining the station at which the individual container will engage the work station trip.

9. In a conveyor system, the combination of an endless traveling conveyor, a plurality of work stations disposed along the side of said conveyor to which work containers are transported by said conveyor, a work container receiving platform for each work station disposed at an angle to the conveyor and sloping downwardly therefrom, and means for removing work containers from said conveyor and transferring them to said container platform, said last mentioned means consisting of a trip at each work station with the trips of different stations disposed at different elevations, the respective station trips being located at a point in advance of the respective station work platforms, and a cooperating trip on each container projecting from the side thereof, the work container trips being adjustable vertically of the container for determining the station at which the individual container will engage the work station trip, and said work container trips having a concave surface engageable with the work station trip to bodily swing the container about the work station trip, said concave surface being shaped to remain in engagement with said work station trip until the major portion of the work container is transferred from the conveyor to the work station platform.

10. In a conveyor system, the combination of an endless traveling conveyor, a plurality of work stations disposed along the side of said conveyor at which work containers are transported by said conveyor, a work container receiving platform for each work station disposed at an angle to the conveyor and slope downwardly therefrom, and means for removing work containers from said conveyor and transferring them to said container platform, said last mentioned means consisting of a trip at each work station with the trips of different stations disposed at different elevations, the respective station trips being located at a point in advance of the respective station work platforms, and a cooperating trip on each container projecting from the side thereof and engageable with the work station trip to bodily swing the container about the work station trip onto said work container receiving platform, the work container trips being adjustable vertically of the container for determining the station at which the individual container will engage the work station trip, said work container trips being located toward the rear of the containers whereby the major portion of a work container will be transferred to a work station platform by the engagement of its trip with a work station trip.

11. In a conveyor system, the combination of an endless traveling conveyor, a plurality of work stations disposed along the side of said conveyor to which work containers are transported by said conveyor, a work container receiving platform for each work station disposed at an angle to the conveyor and sloping downwardly therefrom, and means for removing work containers from said conveyor and transferring them to said container platform, said last mentioned means consisting of a trip at each work station with the trips of different stations disposed at different elevations, the respective station trips being located at a point in advance of the respective station work platform, and a cooperating trip on each container projecting from the side thereof, the work container trips being adjustable vertically of the container for determining the station at which the individual container will engage the work station trip, said work container trips being located toward the rear end of the container and having concave surfaces engageable with the station trips whereby the major portion of a container will be transferred by a pivotal movement of the container about the work station trip on to a work station platform by the engagement of its trip with a work station trip.

12. In a conveyor system for work containers, the combination of conveyor members for transporting said containers, a plurality of groups of work stations including container receiving platforms arranged longitudinally of said conveyor members, a trip member at each station, the trip member of each successive station in each group being located at a level different from that of the trip member of the preceding stations with the trip members of similarly located stations in the several groups being located at the same level, and a trip member projecting from the side of each container, said container trip member being adjustable vertically of the container for engagement with the trip member of a predetermined station when transported to said station by said conveyor members.

13. In a conveyor system, the combination of a conveyor, a plurality of work stations disposed along the side of said conveyor to which work containers are transported by said conveyor, a work container receiving platform for each work station, and means for removing work containers from said conveyor and transferring them to said container receiving platform, said last mentioned means comprising a trip at each work station extending laterally toward the conveyor and having a lip on its outer end projecting in the direction opposite to the direction of conveyor travel, the respective station trips having their lips disposed at different elevations, and a cooperating trip on each container projecting laterally from the side thereof, each container trip having a concave surface engageable by said lip to bodily swing the container about said lip onto said platform, the work container trips being adjustable vertically of the container for determining the station to which the individual container trip will engage the work station trip.

14. In a conveyor system, the combination of a conveyor, a plurality of work stations disposed along the side of said conveyor to which work containers are transported by said conveyor, a work container receiving platform for each work station, and means for removing work containers from said conveyor and transferring them to said container receiving platform, said last mentioned means comprising a trip at each work station extending laterally toward the conveyor and having a lip on its outer end projecting in the direction opposite to the direction of conveyor travel, the respective station trips having their lips disposed at different elevations, and a cooperating trip on each container projecting laterally from the side thereof at a point rearward of the transverse center of the container, each container trip having a concave surface engageable by said lip to bodily swing the container about said lip onto said platform, the work container trips being adjustable vertically of the container for determining the station to which the individual container trip will engage the work station trip.

15. In a conveyor system, the combination of a conveyor, a plurality of work stations disposed along the side of said conveyor to which work containers are transported by said conveyor, a work container receiving platform for each work station, and means for removing work containers from said conveyor and transferring them to said container receiving platform, said last mentioned means comprising a trip at each work station extending laterally toward the conveyor and having a lip on its outer end projecting in the direction opposite to the direction of conveyor travel, the respective station trips having their lips located at a point in advance of the respective work container receiving platform and disposed at different elevations, and a cooperating trip on each container projecting laterally from the side thereof, each container trip having a concave surface engageable by said lip to bodily swing the container about said lip onto said platform, the work container trips being adjustable vertically of the container for determining the station to which the individual container trip will engage the work station trip.

16. In a conveyor system, the combination of a conveyor, a plurality of work stations disposed along the side of said conveyor to which work containers are transported by said conveyor, a work container receiving platform for each work station, and means for removing work containers from said conveyor and transferring them to said container receiving platform, said last mentioned means comprising a trip at each work station extending laterally toward the conveyor and having a lip on its outer end projecting in the direction opposite to the direction of conveyor travel, the respective station trips having their lips located at a point in advance of the respective work container receiving platform and disposed at different elevations, and a cooperating trip on each container projecting laterally thereof at a point rearward of the transverse center of the container, each container trip having a concave surface engageable by said lip to bodily swing the container about said lip onto said platform, the work container trips being adjustable vertically of the container for determining the station to which the individual container trip will engage the work station trip.

17. In an endless conveyor system for work containers, the combination of an endless traveling conveyor, work stations including receiving platforms along opposite sides of said conveyor, means for transferring work containers from said endless conveyor to said platforms at opposite sides of the conveyor, a second endless conveyor at a level below said first mentioned conveyor and below said stations, and return chutes extending downwardly from said platforms at both sides of said first conveyor to opposite sides of said second conveyor for transferring containers from said platforms to said second conveyor.

18. In a multi-floor conveyor system, the combination of lowering means for delivering containers from an upper floor to the next lower floor, an endless traveling conveyor on said next lower floor to one end of which said containers are delivered from said lowering means, work stations on said next lower floor disposed along the side of said endless conveyor, means for removing work containers from said conveyor and depositing them at predetermined work stations on said next lower floor, return ramps at said work stations on which containers are returned to said conveyor, a second lowering means to which said returned containers are delivered at the opposite end of said conveyor and by which said containers are transferred to the second next lower floor, an endless traveling conveyor on the second next lower floor, work packaging stations on said next lower floor, means for transferring containers from said conveyor to said packaging stations on said second next lower floor, an elevator operable between said second next lower floor and said upper floor, a second endless conveyor on said second next lower floor for delivering empty containers to said elevator at said second next lower floor for return to the upper floor; and chutes for returning empty containers from said packaging stations to the second conveyor on the second next lower floor.

JOHN W. WHALEY.

REFERENCES CITED

The following references are of record in the file of this patent:

UNITED STATES PATENTS

| Number | Name | Date |
|---|---|---|
| 656,279 | Wilson | Aug. 21, 1900 |
| 777,235 | Abraham | Dec. 13, 1904 |
| 896,467 | Sands et al. | Aug. 18, 1908 |
| 1,270,501 | Dohm | June 25, 1918 |
| 1,439,825 | Kuhn | Dec. 26, 1922 |
| 1,548,600 | Hansen | Aug. 4, 1925 |
| 1,732,376 | Olson | Oct. 22, 1929 |
| 1,741,782 | La Rocque | Dec. 31, 1929 |
| 1,774,047 | Wharton | Aug. 26, 1930 |
| 1,804,153 | Cowley et al. | May 5, 1931 |
| 1,804,154 | Cowley et al. | May 5, 1931 |
| 1,893,273 | Constable | Jan. 3, 1933 |
| 1,914,778 | Klyver | June 20, 1933 |
| 1,968,547 | Yost | July 31, 1934 |
| 2,353,638 | Beaulieu | July 18, 1944 |
| 2,362,079 | McEann | Nov. 7, 1944 |

FOREIGN PATENTS

| Number | Country | Date |
|---|---|---|
| 17,034 | Australia | July 2, 1929 |